US012137255B2

(12) United States Patent
Tian et al.

(10) Patent No.: US 12,137,255 B2
(45) Date of Patent: Nov. 5, 2024

(54) CODING OF UV COORDINATES

(71) Applicant: Tencent America LLC, Palo Alto, CA (US)

(72) Inventors: Jun Tian, Belle Mead, NJ (US); Chao Huang, Palo Alto, CA (US); Xiaozhong Xu, State College, PA (US); Xiang Zhang, Sunnyvale, CA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 153 days.

(21) Appl. No.: 17/943,269

(22) Filed: Sep. 13, 2022

(65) Prior Publication Data
US 2023/0088886 A1    Mar. 23, 2023

Related U.S. Application Data

(60) Provisional application No. 63/246,218, filed on Sep. 20, 2021.

(51) Int. Cl.
*H01L 29/94*    (2006.01)
*G06T 9/00*    (2006.01)
(Continued)

(52) U.S. Cl.
CPC ............ *H04N 19/91* (2014.11); *G06T 9/001* (2013.01); *G06T 15/04* (2013.01); *H04N 19/124* (2014.11)

(58) Field of Classification Search
CPC .... H04N 19/91; H04N 19/124; H04N 19/503; H04N 19/593; H04N 19/96; H04N 19/597; G06T 9/001; G06T 15/04
See application file for complete search history.

(56) References Cited

U.S. PATENT DOCUMENTS

2004/0136448 A1*    7/2004    Miller ............... H04L 25/03343
                                                    375/222
2008/0298702 A1*    12/2008    Gunupudi .............. H04N 19/18
                                                    382/251
(Continued)

FOREIGN PATENT DOCUMENTS

KR    10-2006-0083111 A    7/2006

OTHER PUBLICATIONS

Supplementary European Search Report mailed Nov. 23, 2023 in Application No. 22870925.9, 8 pages.
(Continued)

*Primary Examiner* — Joseph Suh
(74) *Attorney, Agent, or Firm* — ArentFox Schiff LLP

(57) ABSTRACT

In a method of processing UV coordinates of a three-dimensional (3D) mesh, the UV coordinates of the 3D mesh are received. The UV coordinates are two-dimensional (2D) texture coordinates that include U coordinates in a first axis and V coordinates in a second axis, and are mapped with vertices of the 3D mesh. The UV coordinates of the 3D mesh are processed based on at least one of a quantization process, a separation process, and a transformation process. The quantization process is configured to convert the UV coordinates into a plurality of indicators. The separation process is configured to separate the UV coordinates into the U coordinates and the V coordinates respectively. The transformation process is configured to convert the UV coordinates from a spatial domain into a transform domain. Compression is performed on the processed UV coordinates after the processing of the UV coordinates.

20 Claims, 14 Drawing Sheets

(51) Int. Cl.
*G06T 15/04* (2011.01)
*H04N 19/124* (2014.01)
*H04N 19/91* (2014.01)

(56) References Cited

U.S. PATENT DOCUMENTS

| | | | | |
|---|---|---|---|---|
| 2009/0326831 | A1* | 12/2009 | McGonigle | A61B 5/14551 |
| | | | | 702/19 |
| 2011/0037763 | A1 | 2/2011 | Lee et al. | |
| 2018/0035008 | A1* | 2/2018 | Bai | G06F 3/1245 |
| 2019/0373283 | A1* | 12/2019 | Lindberg | H04N 19/186 |
| 2020/0081841 | A1* | 3/2020 | Samynathan | G06F 12/0859 |
| 2020/0098137 | A1* | 3/2020 | Hemmer | G06T 9/001 |
| 2021/0089907 | A1* | 3/2021 | Rogers | G06F 18/2413 |

OTHER PUBLICATIONS

Jean-Eudes Marvie et al: "[V-PCC][EE2.6-related] Proposition of an anchor and a test model for coding animated meshes", 132. MPEG Meeting; Oct. 12, 2020-Oct. 16, 2020; Online; (Motion Picture Expert Group or ISO/IEC JTC1/SC29/WG11 ), No. m55327, Oct. 8, 2020, pp. 1-27.

Office Action received for Korean Patent Application No. 10-2023-7016288, mailed on Jul. 21, 2024, 10 pages (5 pages of English Translation and 5 pages of Original Document).

\* cited by examiner

CODING OF UV COORDINATES

INCORPORATION BY REFERENCE

The present application claims the benefit of priority to U.S. Provisional Application No. 63/246,218, "Coding of UV Coordinates" filed on Sep. 20, 2021, which is incorporated by reference herein in its entirety.

TECHNICAL FIELD

The present disclosure describes embodiments generally related to mesh coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Various technologies are developed to capture and represent the world, such as objects in the world, environments in the world, and the like in 3-dimensional (3D) space. 3D representations of the world can enable more immersive forms of interaction and communication. In some examples, 3D meshes are widely used to represent such immersive contents.

SUMMARY

Aspects of the disclosure provide methods and apparatuses for mesh coding (e.g., compression and decompression). In some examples, an apparatus for mesh coding includes processing circuitry.

According to an aspect of the disclosure, a method of processing UV coordinates of a three-dimensional (3D) mesh is provided. In the method, the UV coordinates of the 3D mesh can be received. The UV coordinates can be two-dimensional (2D) texture coordinates that include U coordinates in a first axis and V coordinates in a second axis, and be mapped to vertices of the 3D mesh. The UV coordinates of the 3D mesh can be processed based on at least one of a quantization process, a separation process, and a transformation process. The quantization process can be configured to convert the UV coordinates into a plurality of indicators. The separation process can be configured to separate the UV coordinates into the U coordinates and the V coordinates respectively. The transformation process can be configured to convert the UV coordinates from a spatial domain into a transform (or frequency) domain. Compression can be performed on the processed UV coordinates after the processing of the UV coordinates.

In some embodiments, the processing can be based on the quantization process. In an example, a linear scalar quantization can be applied to the U coordinates and the V coordinates of the UV coordinates respectively by dividing the U coordinates with a first scalar factor and the V coordinates with a second scalar factor. In another example, a vector quantization can be applied to a plurality of UV pairs of the UV coordinates. Each UV pair of the plurality of UV pairs can include a respective U coordinate and a respective V coordinate and be represented by an indicator to a vector dictionary of the vector quantization.

In some embodiments, the processing is based on the separation process. Accordingly, the UV coordinates can be separated into the U coordinates and the V coordinates. A first 2D array can be generated based on the U coordinates of the UV coordinates. A second 2D array can be generated based on the V coordinates of the UV coordinates. The compression can subsequently be performed on the U coordinates of the UV coordinates in the first 2D array, and on the V coordinates of the UV coordinates in the second 2D array respectively.

In some embodiments, the processing is based on the transformation process. Accordingly, the transformation process can be performed on a plurality of UV pairs of the UV coordinates based on one of an invertible transform, a Haar transform, or a linear decorrelation transform. Each UV pair of the plurality of UV pairs can include a respective U coordinate and a respective V coordinate of the UV coordinates. First channel information can be generated based on the transformed U coordinates of the plurality of UV pairs of the UV coordinates and second channel information can be generated based on the transformed V coordinates of the plurality of UV pairs of the UV coordinates. The compression can further be performed on the first channel information of the UV coordinates and on the second channel information of the UV coordinates respectively.

In the method, the compression can be performed on the UV coordinates based on one of an image/video compression or an integer compression on the UV coordinates.

In some embodiments, values of the U coordinates of the UV coordinates can be predicted based on values of prior coded U coordinates. A list of prediction residues of the U coordinates can further be generated. Values of the V coordinates of the UV coordinates can be generated based on values of prior coded V coordinates. A list of prediction residues of the V coordinates can be further generated.

In some embodiments, a first mapping operation can be performed on the list of the prediction residues of the U coordinates to generate a list of non-negative integers of the U coordinates. A second mapping operation can be generated on the list of the prediction residues of the V coordinates to generate a list of non-negative integers of the V coordinates.

In some embodiments, a first bit packing process can be performed on the list of the non-negative integers of the U coordinates to generate a list of bits of the U coordinates. A second bit packing process can be performed on the list of the non-negative integers of the V coordinates to generate a list of bits of the V coordinates.

In some embodiments, the compression can be performed on at least one of the list of the prediction residues of the U coordinates, the list of the prediction residues of the V coordinates, the list of the non-negative integers of the U coordinates, the list of the non-negative integers of the V coordinates, the list of bits of the U coordinates, or the list of bits of the V coordinates. In some embodiments, the compression can be performed based on one of an entropy coding, a variable length coding, a Huffman coding, or an arithmetic coding.

In the method, a lossy compression can be performed on the UV coordinates to generate lossy compression residues of the UV coordinates based on one of a lossy image/video codec and a lossy integer compression. A lossless compression can be performed on the lossy compression residues of the UV coordinates based on one of a lossless image/video codec and a lossless integer compression.

According to another aspect of the disclosure, an apparatus is provided. The apparatus includes processing circuitry. The processing circuitry can be configured to perform any of the methods of UV coordinates processing.

Aspects of the disclosure also provide a non-transitory computer-readable medium storing instructions which when executed by a computer for video decoding cause the computer to perform any of the methods of UV coordinates processing.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1:
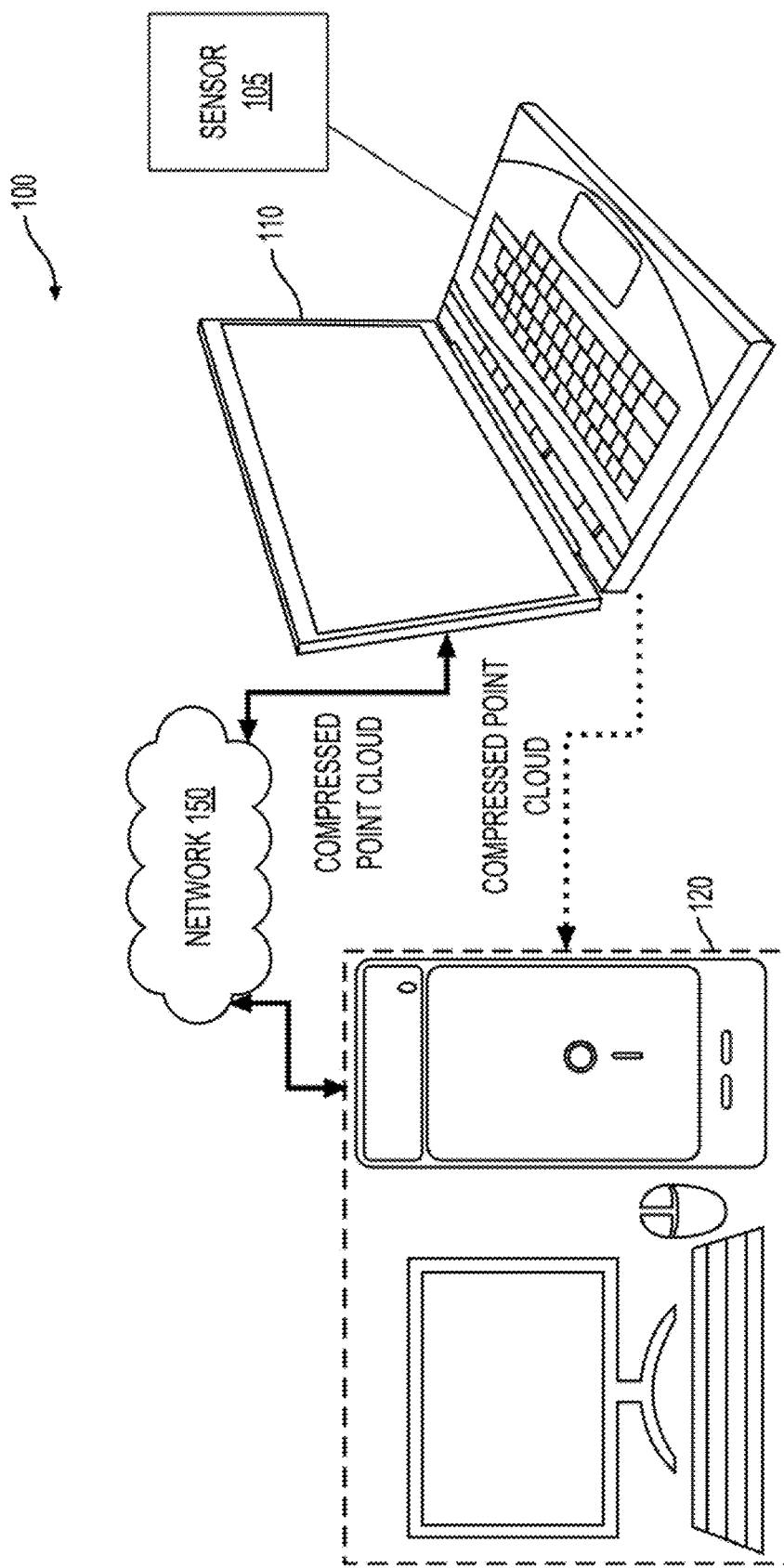
FIG. 1 shows a block diagram of a communication system in some examples.

Aspects of the disclosure include techniques in the field of three dimensional (3D) media processing.

Technology developments in 3D media processing, such as advances in three dimensional (3D) capture, 3D modeling, 3D rendering, and the like have promoted the ubiquitous presence of 3D media contents across several platforms and devices. In an example, a baby's first step can be captured in one continent, media technology can allow grandparents to view (and maybe interact) and enjoy an immersive experience with the baby in another continent. According to an aspect of the disclosure, in order to improve immersive experiences, 3D models are becoming ever more sophisticated, and the creation and consumption of 3D models occupy a significant amount of data resources, such as data storage and data transmission resources.

In some embodiments, point clouds and meshes can be used as 3D models to represent immersive contents.

A point cloud generally may refer to a set of points in a 3D space, each with associated attributes, such as color, material properties, texture information, intensity attributes, reflectivity attributes, motion related attributes, modality attributes, and various other attributes. Point clouds can be used to reconstruct an object or a scene as a composition of such points.

A mesh (also referred to as mesh model) of an object can include polygons that describe the surface of the object. Each polygon can be defined by vertices of the polygon in 3D space and the information of how the vertices are connected into the polygon. The information of how the vertices are connected is referred to as connectivity information. In some examples, the mesh can also include attributes, such as color, normal, and the like, associated with the vertices.

In some embodiments, some coding tools for point cloud compression (PCC) can be used for mesh compression. For example, a mesh can be re-meshed to generate a new mesh for which the connectivity information of vertices of the new mesh can be inferred (or predefined). The vertices of the new mesh, and the attributes associated with the vertices of the new mesh can be considered as points in a point cloud and can be compressed using PCC codecs.

Point clouds can be used to reconstruct an object or a scene as a composition of such points. The points can be captured using multiple cameras, depth sensors or Lidar in various setups and may be made up of thousands up to billions of points in order to realistically represent reconstructed scenes or objects. A patch generally may refer to a contiguous subset of the surface described by the point cloud. In an example, a patch includes points with surface normal vectors that deviate from one another less than a threshold amount.

PCC can be performed according to various schemes, such as a geometry-based scheme that is referred to as G-PCC, a video coding based scheme that is referred to as V-PCC, and the like. According to some aspects of the disclosure, the G-PCC encodes the 3D geometry directly and is a purely geometry-based approach without much to share with video coding, and the V-PCC is heavily based on video coding. For example, V-PCC can map a point of the 3D cloud to a pixel of a 2D grid (an image). The V-PCC scheme can utilize generic video codecs for point cloud compression. A PCC codec (encoder/decoder) in the present disclosure can be G-PCC codec (encoder/decoder) or V-PCC codec.

According to an aspect of the disclosure, the V-PCC scheme can use existing video codecs to compress the geometry, occupancy, and texture of a point cloud as three separate video sequences. The extra metadata needed to interpret the three video sequences is compressed separately. A small portion of the overall bitstream is the metadata, which could be encoded/decoded efficiently using software implementation in an example. The bulk of the information is handled by the video codec.

FIG. 1 illustrates a block diagram of a communication system (100) in some examples. The communication system (100) includes a plurality of terminal devices that can communicate with each other, via, for example, a network (150). For example, the communication system (100) includes a pair of terminal devices (110) and (120) interconnected via the network (150). In the FIG. 1 example, the first pair of terminal devices (110) and (120) may perform unidirectional transmission of point cloud data. For example, the terminal device (110) may compress a point cloud (e.g., points representing a structure) that is captured by a sensor (105) connected with the terminal device (110). The compressed point cloud can be transmitted, for example in the form of a bitstream, to the other terminal device (120) via the network (150). The terminal device (120) may receive the compressed point cloud from the network (150), decompress the bitstream to reconstruct the point cloud, and suitably display the reconstructed point cloud. Unidirectional data transmission may be common in media serving applications and the like.

In the FIG. 1 example, the terminal devices (110) and (120) may be illustrated as servers, and personal computers, but the principles of the present disclosure may be not so limited. Embodiments of the present disclosure find application with laptop computers, tablet computers, smart phones, gaming terminals, media players, and/or dedicated three-dimensional (3D) equipment. The network (150) represents any number of networks that transmit compressed point cloud between the terminal devices (110) and (120). The network (150) can include for example wireline (wired) and/or wireless communication networks. The network (150) may exchange data in circuit-switched and/or packet-switched channels. Representative networks include telecommunications networks, local area networks, wide area networks, the Internet, and the like.

Figure 2:
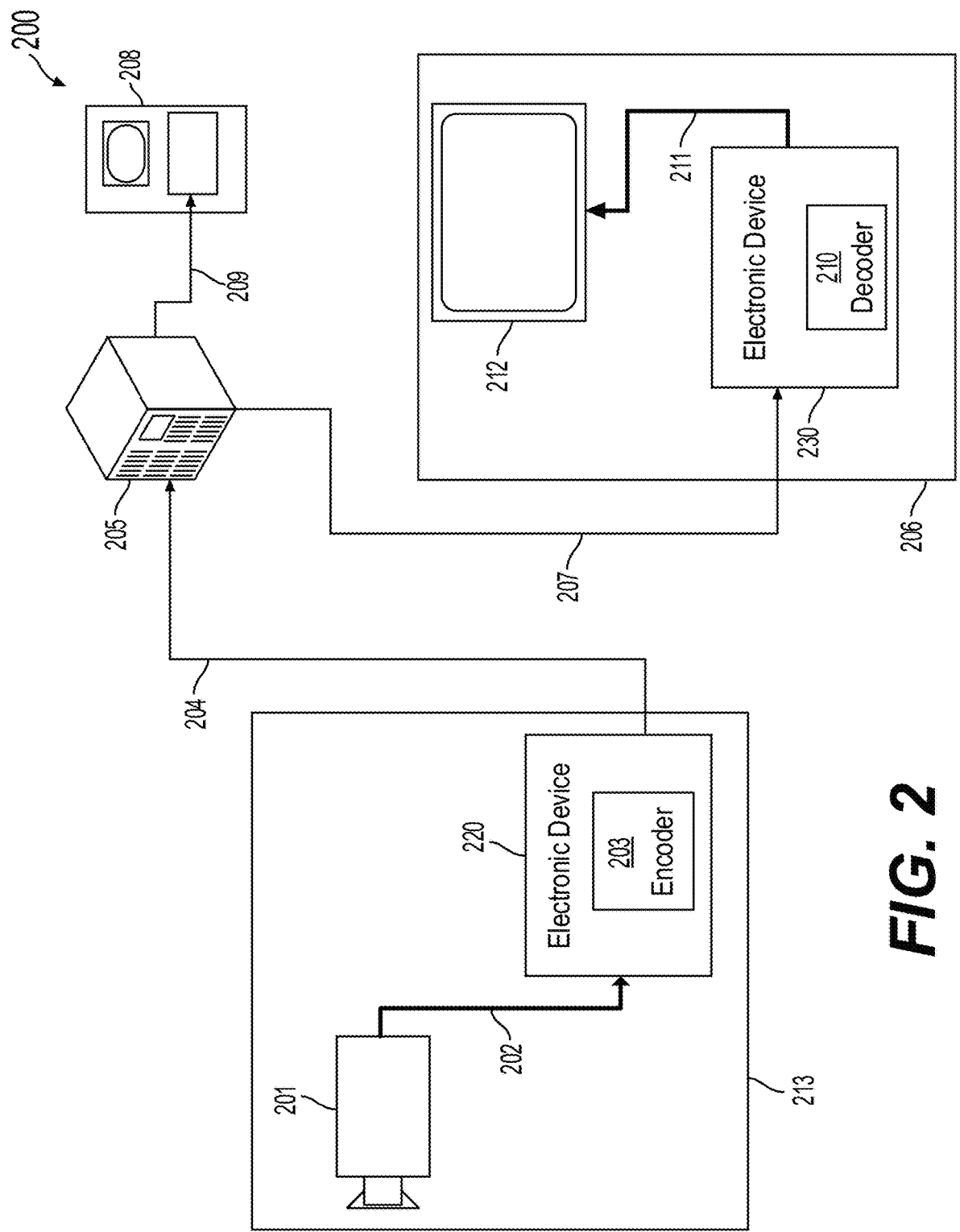
FIG. 2 shows a block diagram of a streaming system in some examples.

FIG. 2 illustrates a block diagram of a streaming system (200) in some examples. The streaming system (200) is a use application of point cloud. The disclosed subject matter can be equally applicable to other point cloud enabled applications, such as, 3D telepresence application, virtual reality application, and the like.

The streaming system (200) may include a capture subsystem (213). The capture subsystem (213) can include a point cloud source (201), for example light detection and ranging (LIDAR) systems, 3D cameras, 3D scanners, a graphics generation component that generates the uncompressed point cloud in software, and the like that generates for example point clouds (202) that are uncompressed. In an example, the point clouds (202) include points that are captured by the 3D cameras. The point clouds (202), depicted as a bold line to emphasize a high data volume when compared to compressed point clouds (204) (a bitstream of compressed point clouds). The compressed point clouds (204) can be generated by an electronic device (220) that includes an encoder (203) coupled to the point cloud source (201). The encoder (203) can include hardware, software, or a combination thereof to enable or implement aspects of the disclosed subject matter as described in more detail below. The compressed point clouds (204) (or bitstream of compressed point clouds (204)), depicted as a thin line to emphasize the lower data volume when compared to the stream of point clouds (202), can be stored on a streaming server (205) for future use. One or more streaming client subsystems, such as client subsystems (206) and (208) in FIG. 2 can access the streaming server (205) to retrieve copies (207) and (209) of the compressed point cloud (204). A client subsystem (206) can include a decoder (210), for example, in an electronic device (230). The decoder (210) decodes the incoming copy (207) of the compressed point clouds and creates an outgoing stream of reconstructed point clouds (211) that can be rendered on a rendering device (212).

It is noted that the electronic devices (220) and (230) can include other components (not shown). For example, the electronic device (220) can include a decoder (not shown) and the electronic device (230) can include an encoder (not shown) as well.

In some streaming systems, the compressed point clouds (204), (207), and (209) (e.g., bitstreams of compressed point clouds) can be compressed according to certain standards. In some examples, video coding standards are used in the compression of point clouds. Examples of those standards include, High Efficiency Video Coding (HEVC), Versatile Video Coding (VVC), and the like.

Figure 3:
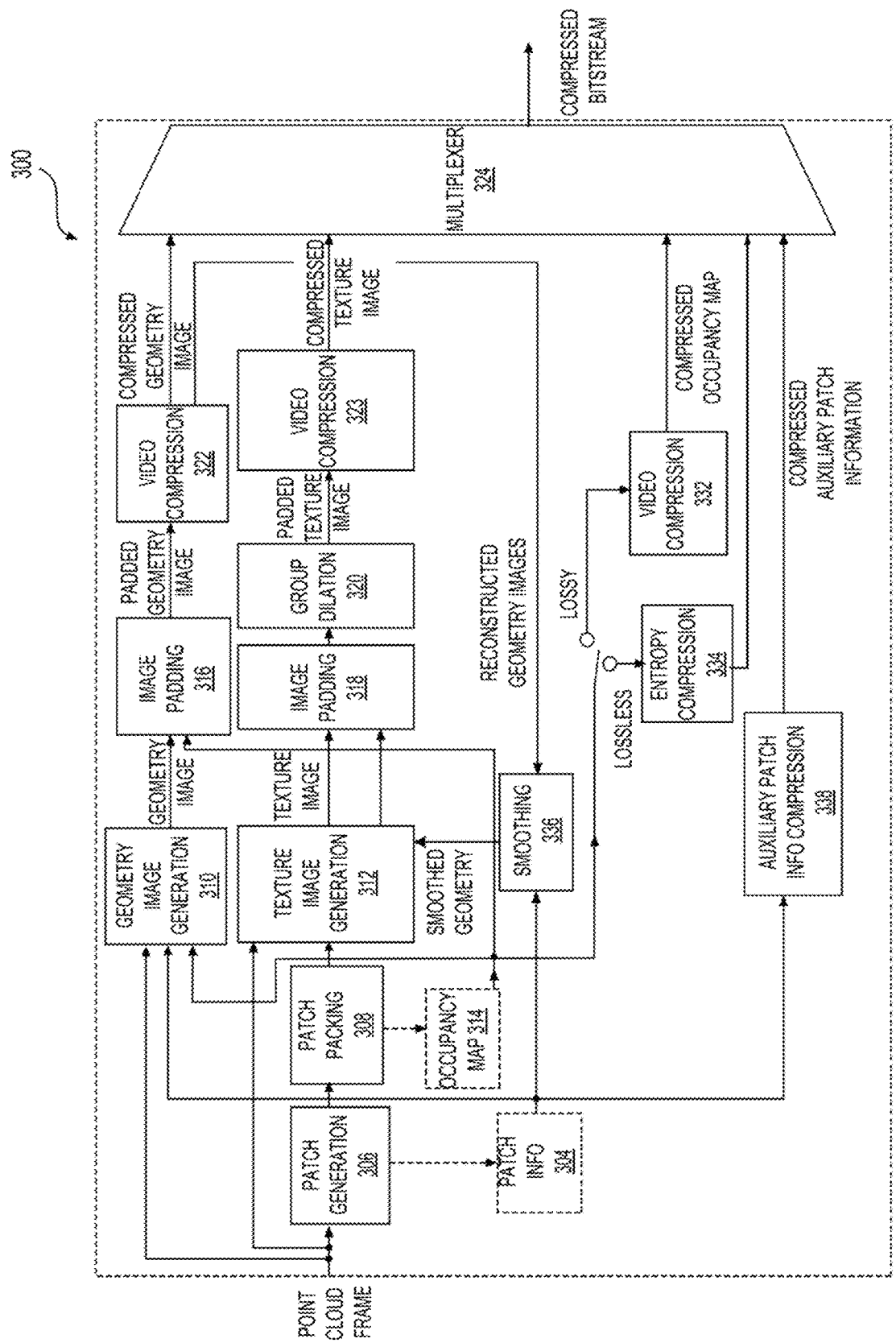
FIG. 3 shows a block diagram of an encoder for encoding point cloud frames in some examples.

FIG. 3 shows a block diagram of a V-PCC encoder (300) for encoding point cloud frames, according to some embodiments. In some embodiments, the V-PCC encoder (300) can be used in the communication system (100) and streaming system (200). For example, the encoder (203) can be configured and operate in a similar manner as the V-PCC encoder (300).

The V-PCC encoder (300) receives point cloud frames as uncompressed inputs and generates bitstream corresponding to compressed point cloud frames. In some embodiments, the V-PCC encoder (300) may receive the point cloud frames from a point cloud source, such as the point cloud source (201) and the like.

In the FIG. 3 example, the V-PCC encoder (300) includes a patch generation module (306), a patch packing module (308), a geometry image generation module (310), a texture image generation module (312), a patch info module (304), an occupancy map module (314), a smoothing module (336), image padding modules (316) and (318), a group dilation module (320), video compression modules (322), (323) and (332), an auxiliary patch info compression module (338), an entropy compression module (334), and a multiplexer (324).

According to an aspect of the disclosure, the V-PCC encoder (300), converts 3D point cloud frames into image-based representations along with some metadata (e.g., occupancy map and patch info) that is used to convert the compressed point cloud back into a decompressed point cloud. In some examples, the V-PCC encoder (300) can convert 3D point cloud frames into geometry images, texture images and occupancy maps, and then use video coding techniques to encode the geometry images, texture images and occupancy maps into a bitstream. Generally, a geometry image is a 2D image with pixels filled with geometry values associated with points projected to the pixels, and a pixel filled with a geometry value can be referred to as a geometry sample. A texture image is a 2D image with pixels filled with texture values associated with points projected to the pixels, and a pixel filled with a texture value can be referred to as a texture sample. An occupancy map is a 2D image with pixels filled with values that indicate occupied or unoccupied by patches.

The patch generation module (306) segments a point cloud into a set of patches (e.g., a patch is defined as a contiguous subset of the surface described by the point cloud), which may be overlapping or not, such that each patch may be described by a depth field with respect to a plane in 2D space. In some embodiments, the patch generation module (306) aims at decomposing the point cloud into a minimum number of patches with smooth boundaries, while also minimizing the reconstruction error.

In some examples, the patch info module (304) can collect the patch information that indicates sizes and shapes of the patches. In some examples, the patch information can be packed into an image frame and then encoded by the auxiliary patch info compression module (338) to generate the compressed auxiliary patch information.

In some examples, the patch packing module (308) is configured to map the extracted patches onto a 2 dimensional (2D) grid while minimize the unused space and guarantee that every M×M (e.g., 16×16) block of the grid is associated with a unique patch. Efficient patch packing can directly impact the compression efficiency either by minimizing the unused space or ensuring temporal consistency.

The geometry image generation module (310) can generate 2D geometry images associated with geometry of the point cloud at given patch locations. The texture image generation module (312) can generate 2D texture images associated with texture of the point cloud at given patch locations. The geometry image generation module (310) and the texture image generation module (312) exploit the 3D to 2D mapping computed during the packing process to store the geometry and texture of the point cloud as images. In order to better handle the case of multiple points being projected to the same sample, each patch is projected onto two images, referred to as layers. In an example, geometry image is represented by a monochromatic frame of W×H in YUV420-8 bit format. To generate the texture image, the texture generation procedure exploits the reconstructed/smoothed geometry in order to compute the colors to be associated with the re-sampled points.

The occupancy map module (314) can generate an occupancy map that describes padding information at each unit. For example, the occupancy image includes a binary map that indicates for each cell of the grid whether the cell belongs to the empty space or to the point cloud. In an example, the occupancy map uses binary information describing for each pixel whether the pixel is padded or not. In another example, the occupancy map uses binary information describing for each block of pixels whether the block of pixels is padded or not.

The occupancy map generated by the occupancy map module (314) can be compressed using lossless coding or lossy coding. When lossless coding is used, the entropy compression module (334) is used to compress the occupancy map. When lossy coding is used, the video compression module (332) is used to compress the occupancy map.

It is noted that the patch packing module (308) may leave some empty spaces between 2D patches packed in an image frame. The image padding modules (316) and (318) can fill the empty spaces (referred to as padding) in order to generate an image frame that may be suited for 2D video and image codecs. The image padding is also referred to as background filling which can fill the unused space with redundant information. In some examples, a good background filling minimally increases the bit rate while does not introduce significant coding distortion around the patch boundaries.

The video compression modules (322), (323), and (332) can encode the 2D images, such as the padded geometry images, padded texture images, and occupancy maps based on a suitable video coding standard, such as HEVC, VVC and the like. In an example, the video compression modules (322), (323), and (332) are individual components that operate separately. It is noted that the video compression modules (322), (323), and (332) can be implemented as a single component in another example.

In some examples, the smoothing module (336) is configured to generate a smoothed image of the reconstructed geometry image. The smoothed image can be provided to the texture image generation (312). Then, the texture image generation (312) may adjust the generation of the texture image based on the reconstructed geometry images. For example, when a patch shape (e.g. geometry) is slightly distorted during encoding and decoding, the distortion may be taken into account when generating the texture images to correct for the distortion in patch shape.

In some embodiments, the group dilation (320) is configured to pad pixels around the object boundaries with redundant low-frequency content in order to improve coding gain as well as visual quality of reconstructed point cloud.

The multiplexer (324) can multiplex the compressed geometry image, the compressed texture image, the compressed occupancy map, the compressed auxiliary patch information into a compressed bitstream.

Figure 4:
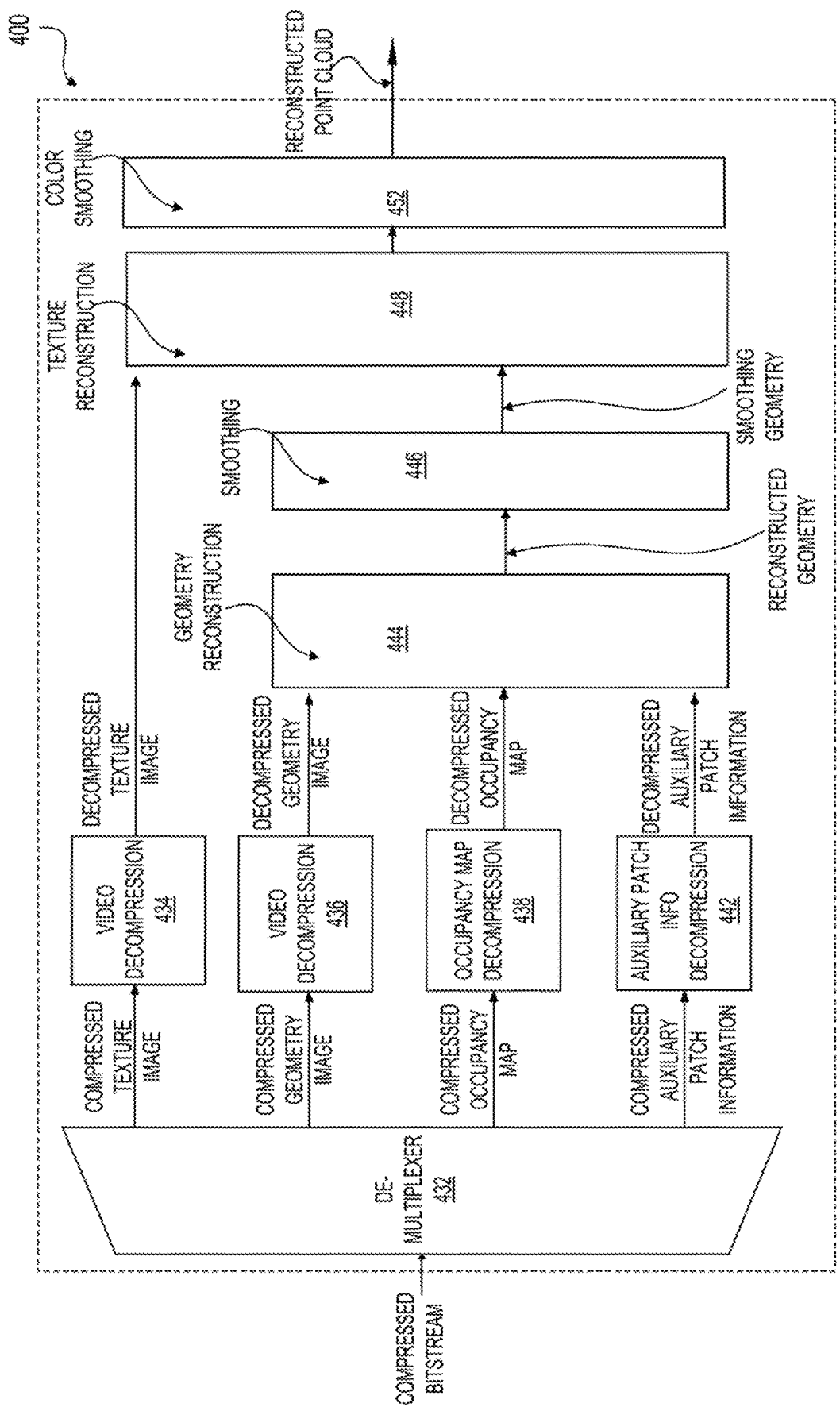
FIG. 4 shows a block diagram of a decoder for decoding a compressed bitstream corresponding to point cloud frames in some examples.

FIG. 4 shows a block diagram of a V-PCC decoder (400) for decoding compressed bitstream corresponding to point cloud frames, in some examples. In some examples, the V-PCC decoder (400) can be used in the communication system (100) and streaming system (200). For example, the decoder (210) can be configured to operate in a similar manner as the V-PCC decoder (400). The V-PCC decoder (400) receives the compressed bitstream, and generates reconstructed point cloud based on the compressed bitstream.

In the FIG. 4 example, the V-PCC decoder (400) includes a de-multiplexer (432), video decompression modules (434) and (436), an occupancy map decompression module (438), an auxiliary patch-information decompression module (442), a geometry reconstruction module (444), a smoothing module (446), a texture reconstruction module (448), and a color smoothing module (452).

The de-multiplexer (432) can receive and separate the compressed bitstream into compressed texture image, compressed geometry image, compressed occupancy map, and compressed auxiliary patch information.

The video decompression modules (434) and (436) can decode the compressed images according to a suitable standard (e.g., HEVC, VVC, etc.) and output decompressed images. For example, the video decompression module (434) decodes the compressed texture images and outputs decompressed texture images; and the video decompression module (436) decodes the compressed geometry images and outputs the decompressed geometry images.

The occupancy map decompression module (438) can decode the compressed occupancy maps according to a suitable standard (e.g., HEVC, VVC, etc.) and output decompressed occupancy maps.

The auxiliary patch-information decompression module (442) can decode the compressed auxiliary patch information according to a suitable standard (e.g., HEVC, VVC, etc.) and output decompressed auxiliary patch information.

The geometry reconstruction module (444) can receive the decompressed geometry images, and generate reconstructed point cloud geometry based on the decompressed occupancy map and decompressed auxiliary patch information.

The smoothing module (446) can smooth incongruences at edges of patches. The smoothing procedure aims at alleviating potential discontinuities that may arise at the patch boundaries due to compression artifacts. In some embodiments, a smoothing filter may be applied to the pixels located on the patch boundaries to alleviate the distortions that may be caused by the compression/decompression.

The texture reconstruction module (448) can determine texture information for points in the point cloud based on the decompressed texture images and the smoothing geometry.

The color smoothing module (452) can smooth incongruences of coloring. Non-neighboring patches in 3D space are often packed next to each other in 2D videos. In some examples, pixel values from non-neighboring patches might be mixed up by the block-based video codec. The goal of color smoothing is to reduce the visible artifacts that appear at patch boundaries.

Figure 5:
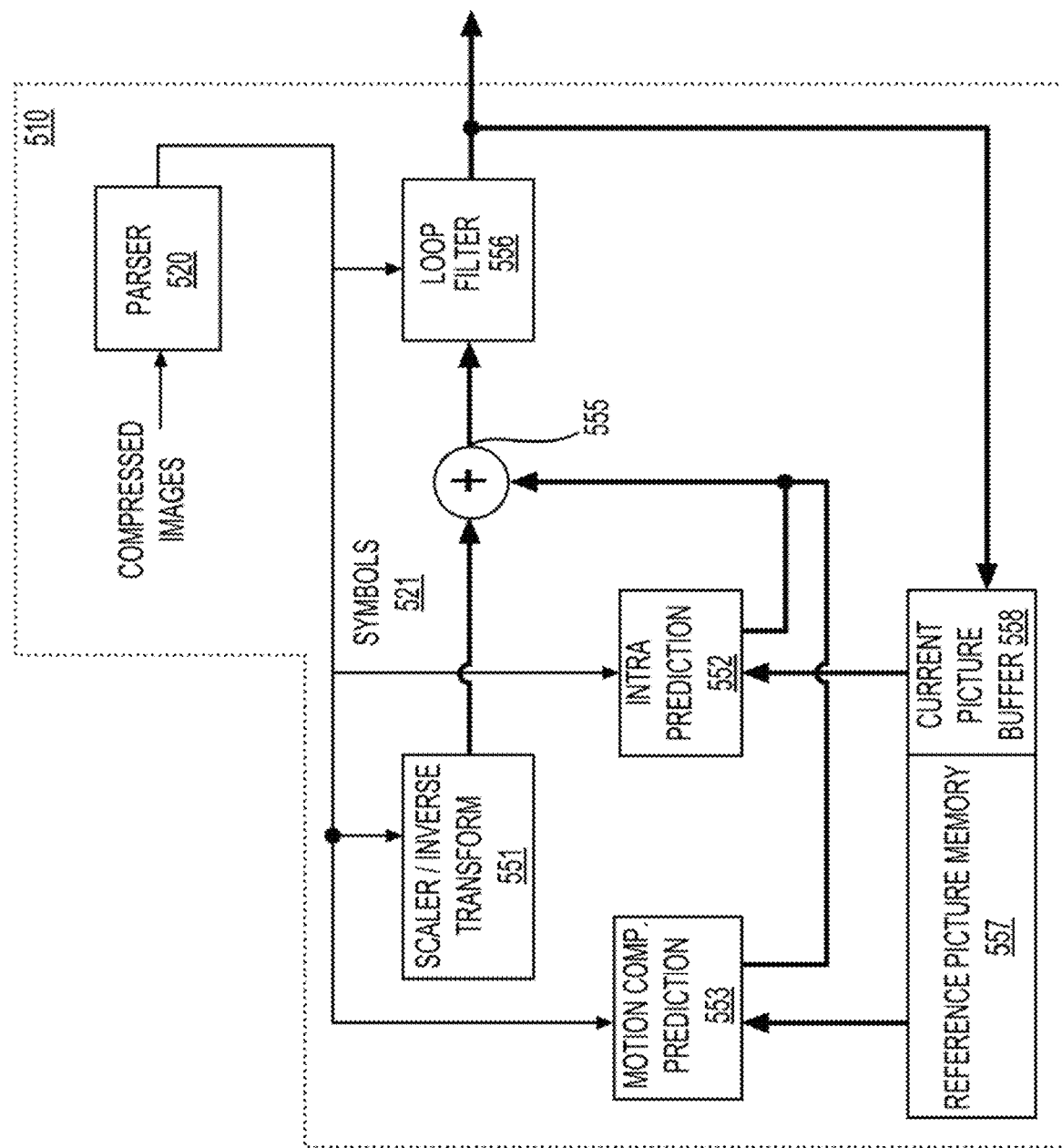
FIG. 5 shows a block diagram of a video decoder in some examples.

FIG. 5 shows a block diagram of a video decoder (510) in some examples. The video decoder (510) can be used in the V-PCC decoder (400). For example, the video decompression modules (434) and (436), the occupancy map decompression module (438) can be similarly configured as the video decoder (510).

The video decoder (510) may include a parser (520) to reconstruct symbols (521) from compressed images, such as the coded video sequence. Categories of those symbols include information used to manage operation of the video decoder (510). The parser (520) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (520) may also extract from the coded video sequence information such as transform coefficients, quantizer parameter values, motion vectors, and so forth.

The parser (520) may perform an entropy decoding/parsing operation on the video sequence received from a buffer memory, so as to create symbols (521).

Reconstruction of the symbols (521) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (520). The flow of such subgroup control information between the parser (520) and the multiple units below is not depicted for clarity.

Beyond the functional blocks already mentioned, the video decoder (510) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (551). The scaler/inverse transform unit (551) receives a quantized transform coefficient as well as control information, including which transform to use, block size, quantization factor, quantization scaling matrices, etc. as symbol(s) (521) from the parser (520). The scaler/inverse transform unit (551) can output blocks comprising sample values that can be input into aggregator (555).

In some cases, the output samples of the scaler/inverse transform (551) can pertain to an intra coded block; that is: a block that is not using predictive information from previously reconstructed pictures, but can use predictive information from previously reconstructed parts of the current picture. Such predictive information can be provided by an intra picture prediction unit (552). In some cases, the intra picture prediction unit (552) generates a block of the same size and shape of the block under reconstruction, using surrounding already reconstructed information fetched from the current picture buffer (558). The current picture buffer (558) buffers, for example, partly reconstructed current picture and/or fully reconstructed current picture. The aggregator (555), in some cases, adds, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated block. In such a case, a motion compensation prediction unit (553) can access reference picture memory (557) to fetch samples used for prediction. After motion compensating the fetched samples in accordance with the symbols (521) pertaining to the block, these samples can be added by the aggregator (555) to the output of the scaler/inverse transform unit (551) (in this case called the residual samples or residual signal) so as to generate output sample information. The addresses within the reference picture memory (557) from where the motion compensation prediction unit (553) fetches prediction samples can be controlled by motion vectors, available to the motion compensation prediction unit (553) in the form of symbols (521) that can have, for example X, Y, and reference picture components. Motion compensation also can include interpolation of sample values as fetched from the reference picture memory (557) when sub-sample exact motion vectors are in use, motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video sequence (also referred to as coded video bitstream) and made available to the loop filter unit (556) as symbols (521) from the parser (520), but can also be responsive to meta-information obtained during the decoding of previous (in decoding order) parts of the coded picture or coded video sequence, as well as responsive to previously reconstructed and loop-filtered sample values.

The output of the loop filter unit (556) can be a sample stream that can be output to a render device as well as stored in the reference picture memory (557) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (520)), the current picture buffer (558) can become a part of the reference picture memory (557), and a fresh current picture buffer can be reallocated before commencing the reconstruction of the following coded picture.

The video decoder (510) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

Figure 6:
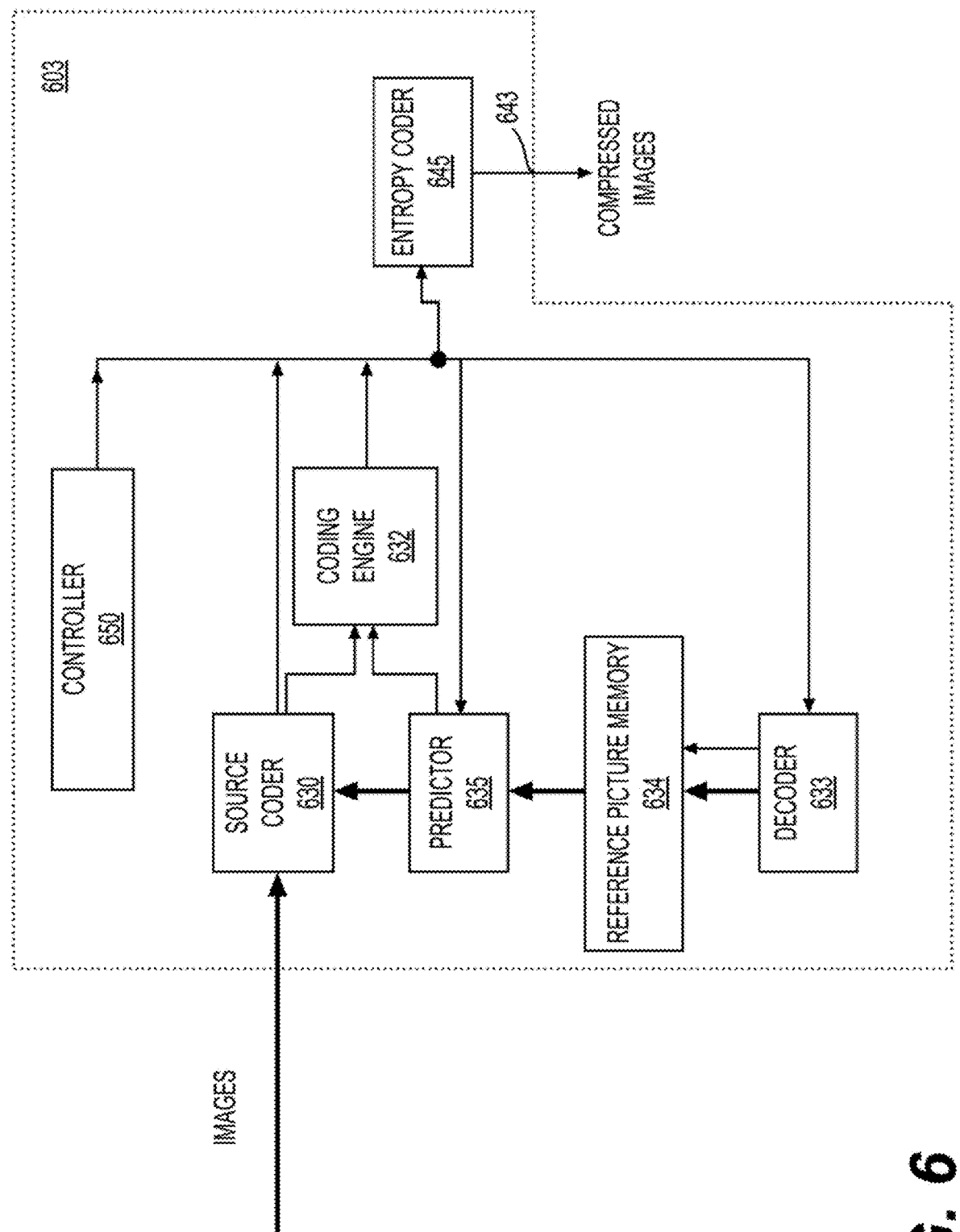
FIG. 6 shows a block diagram of a video encoder in some examples.

FIG. 6 shows a block diagram of a video encoder (603) according to an embodiment of the present disclosure. The video encoder (603) can be used in the V-PCC encoder (300) that compresses point clouds. In an example, the video compression module (322) and (323), and the video compression module (332) are configured similarly to the encoder (603).

The video encoder (603) may receive images, such as padded geometry images, padded texture images and the like, and generate compressed images.

According to an embodiment, the video encoder (603) may code and compress the pictures of the source video sequence (images) into a coded video sequence (compressed images) in real time or under any other time constraints as required by the application. Enforcing appropriate coding speed is one function of a controller (650). In some embodiments, the controller (650) controls other functional units as described below and is functionally coupled to the other functional units. The coupling is not depicted for clarity. Parameters set by the controller (650) can include rate control related parameters (picture skip, quantizer, lambda value of rate-distortion optimization techniques, . . . ), picture size, group of pictures (GOP) layout, maximum motion vector search range, and so forth. The controller (650) can be configured to have other suitable functions that pertain to the video encoder (603) optimized for a certain system design.

In some embodiments, the video encoder (603) is configured to operate in a coding loop. As an oversimplified description, in an example, the coding loop can include a source coder (630) (e.g., responsible for creating symbols, such as a symbol stream, based on an input picture to be coded, and a reference picture(s)), and a (local) decoder (633) embedded in the video encoder (603). The decoder (633) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (634). As the decoding of a symbol stream leads to bit-exact results independent of decoder location (local or remote), the content in the reference picture memory (634) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (633) can be the same as of a "remote" decoder, such as the video decoder (510), which has already been described in detail above in conjunction with FIG. 5. Briefly referring also to FIG. 5, however, as symbols are available and encoding/decoding of symbols to a coded video sequence by an entropy coder (645) and the parser (520) can be lossless, the entropy decoding parts of the video decoder (510), including and parser (520) may not be fully implemented in the local decoder (633).

During operation, in some examples, the source coder (630) may perform motion compensated predictive coding, which codes an input picture predictively with reference to one or more previously-coded picture from the video sequence that were designated as "reference pictures". In this manner, the coding engine (632) codes differences between pixel blocks of an input picture and pixel blocks of reference picture(s) that may be selected as prediction reference(s) to the input picture.

The local video decoder (633) may decode coded video data of pictures that may be designated as reference pictures, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference pictures and may cause reconstructed reference pictures to be stored in the reference picture cache (634). In this manner, the video encoder (603) may store copies of reconstructed reference pictures locally that have common content as the reconstructed reference pictures that will be obtained by a far-end video decoder (absent transmission errors).

The predictor (635) may perform prediction searches for the coding engine (632). That is, for a new picture to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the source coder (630), including, for example, setting of parameters and subgroup parameters used for encoding the video data.

Output of all aforementioned functional units may be subjected to entropy coding in the entropy coder (645). The entropy coder (645) translates the symbols as generated by the various functional units into a coded video sequence, by lossless compressing the symbols according to technologies such as Huffman coding, variable length coding, arithmetic coding, and so forth.

The controller (650) may manage operation of the video encoder (603). During coding, the controller (650) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (603) may perform coding operations according to a predetermined video coding technology or standard, such as ITU-T Rec. H.265. In its operation, the video encoder (603) may perform various compression operations, including predictive coding operations that exploit temporal and spatial redundancies in the input video sequence. The coded video data, therefore, may conform to a syntax specified by the video coding technology or standard being used.

A video may be in the form of a plurality of source pictures (images) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 7:
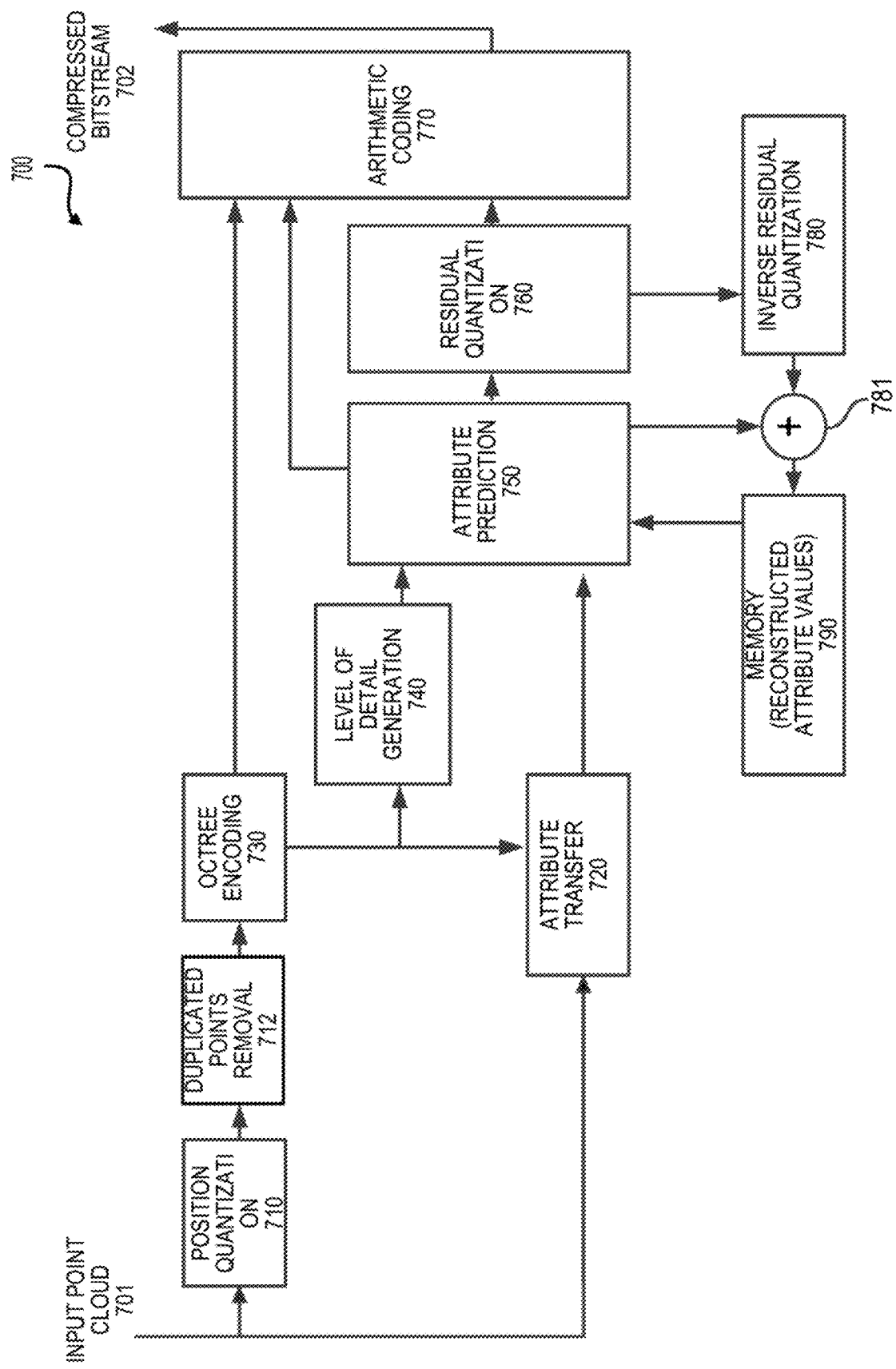
FIG. 7 shows a block diagram of an encoder for encoding point cloud frames, in some examples.

FIG. 7 shows a block diagram of a G-PCC encoder (700) in some examples. The G-PCC encoder (700) can be configured to receive point cloud data and compress the point cloud data to generate a bit stream carrying compressed point cloud data. In an embodiment, the G-PCC encoder (700) can include a position quantization module (710), a duplicated points removal module (712), an octree encoding module (730), an attribute transfer module (720), a level of detail (LOD) generation module (740), an attribute prediction module (750), a residual quantization module (760), an arithmetic coding module (770), an inverse residual quantization module (780), an addition module (781), and a memory (790) to store reconstructed attribute values.

As shown, an input point cloud (701) can be received at the G-PCC encoder (700). Positions (e.g., 3D coordinates) of the point cloud (701) are provided to the quantization module (710). The quantization module (710) is configured to quantize the coordinates to generate quantized positions. The duplicated points removal module (712) is configured to receive the quantized positions and perform a filter process to identify and remove duplicated points. The octree encoding module (730) is configured to receive filtered positions from the duplicated points removal module (712), and perform an octree-based encoding process to generate a sequence of occupancy codes that describe a 3D grid of voxels. The occupancy codes are provided to the arithmetic coding module (770).

The attribute transfer module (720) is configured to receive attributes of the input point cloud, and perform an attribute transfer process to determine an attribute value for each voxel when multiple attribute values are associated with the respective voxel. The attribute transfer process can be performed on the re-ordered points output from the octree encoding module (730). The attributes after the transfer operations are provided to the attribute prediction module (750). The LOD generation module (740) is configured to operate on the re-ordered points output from the octree encoding module (730), and re-organize the points into different LODs. LOD information is supplied to the attribute prediction module (750).

The attribute prediction module (750) processes the points according to an LOD-based order indicated by the LOD information from the LOD generation module (740). The attribute prediction module (750) generates an attribute prediction for a current point based on reconstructed attributes of a set of neighboring points of the current point stored in the memory (790). Prediction residuals can subsequently be obtained based on original attribute values received from the attribute transfer module (720) and locally generated attribute predictions. When candidate indices are used in the respective attribute prediction process, an index corresponding to a selected prediction candidate may be provided to the arithmetic coding module (770).

The residual quantization module (760) is configured to receive the prediction residuals from the attribute prediction module (750), and perform quantization to generate quantized residuals. The quantized residuals are provided to the arithmetic coding module (770).

The inverse residual quantization module (780) is configured to receive the quantized residuals from the residual quantization module (760), and generate reconstructed prediction residuals by performing an inverse of the quantization operations performed at the residual quantization module (760). The addition module (781) is configured to receive the reconstructed prediction residuals from the inverse residual quantization module (780), and the respective attribute predictions from the attribute prediction module (750). By combining the reconstructed prediction residuals and the attribute predictions, the reconstructed attribute values are generated and stored to the memory (790).

The arithmetic coding module (770) is configured to receive the occupancy codes, the candidate indices (if used), the quantized residuals (if generated), and other information, and perform entropy encoding to further compress the received values or information. As a result, a compressed bitstream (702) carrying the compressed information can be generated. The bitstream (702) may be transmitted, or otherwise provided, to a decoder that decodes the compressed bitstream, or may be stored in a storage device.

Figure 8:
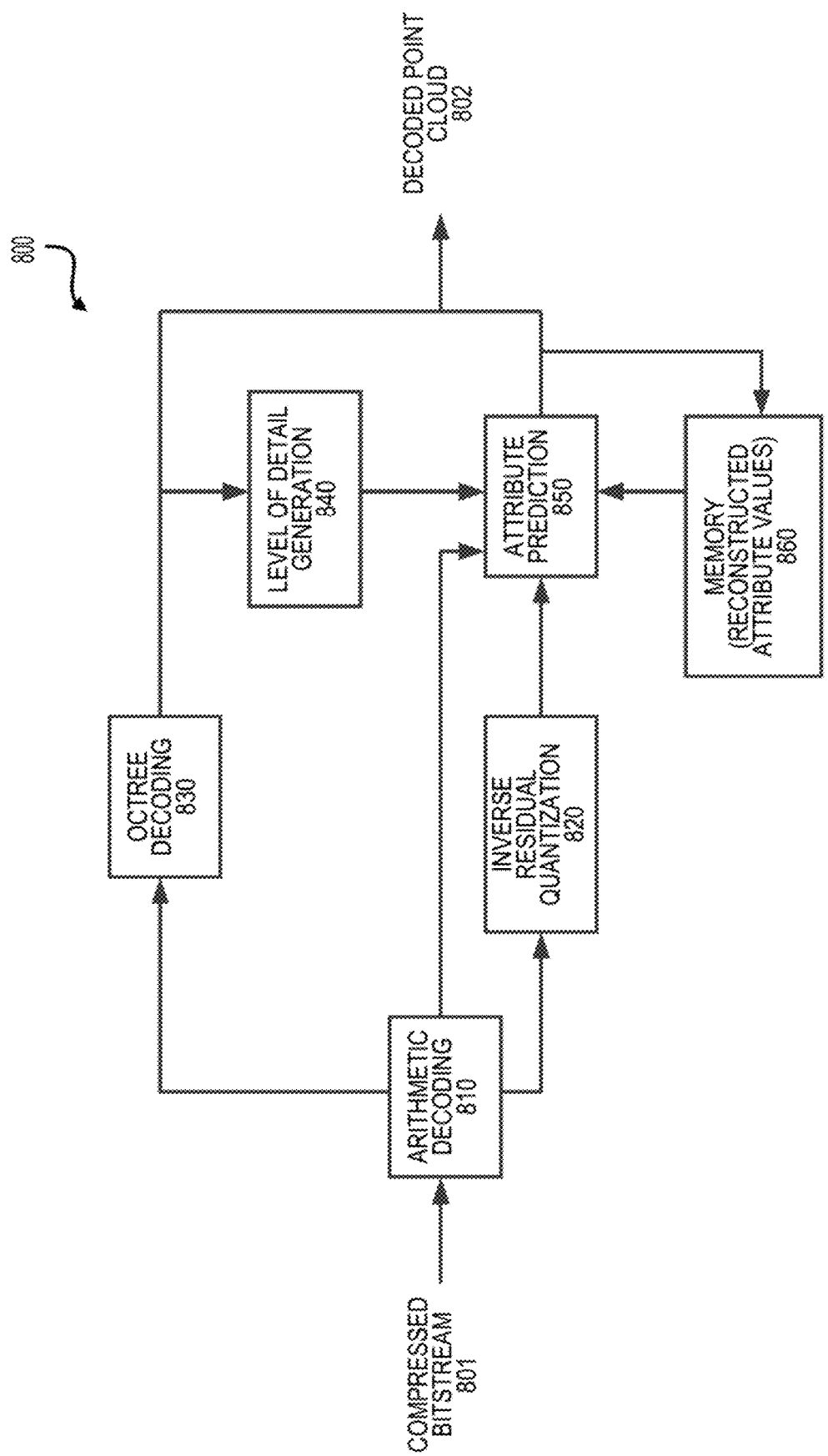
FIG. 8 shows a block diagram of a decoder for decoding a compressed bitstream corresponding to point cloud frames in some examples.

FIG. 8 shows a block diagram of a G-PCC decoder (800) in accordance with an embodiment. The G-PCC decoder (800) can be configured to receive a compressed bitstream and perform point cloud data decompression to decompress the bitstream to generate decoded point cloud data. In an embodiment, the G-PCC decoder (800) can include an arithmetic decoding module (810), an inverse residual quantization module (820), an octree decoding module (830), an LOD generation module (840), an attribute prediction module (850), and a memory (860) to store reconstructed attribute values.

As shown, a compressed bitstream (801) can be received at the arithmetic decoding module (810). The arithmetic decoding module (810) is configured to decode the compressed bitstream (801) to obtain quantized residuals (if generated) and occupancy codes of a point cloud. The octree decoding module (830) is configured to determine reconstructed positions of points in the point cloud according to the occupancy codes. The LOD generation module (840) is configured to re-organize the points into different LODs based on the reconstructed positions, and determine an LOD-based order. The inverse residual quantization module (820) is configured to generate reconstructed residuals based on the quantized residuals received from the arithmetic decoding module (810).

The attribute prediction module (850) is configured to perform an attribute prediction process to determine attribute predictions for the points according to the LOD-based order. For example, an attribute prediction of a current point can be determined based on reconstructed attribute values of neighboring points of the current point stored in the memory (860). In some examples, the attribute prediction can be combined with a respective reconstructed residual to generate a reconstructed attribute for the current point.

A sequence of reconstructed attributes generated from the attribute prediction module (850) together with the reconstructed positions generated from the octree decoding module (830) corresponds to a decoded point cloud (802) that is output from the G-PCC decoder (800) in one example. In addition, the reconstructed attributes are also stored into the memory (860) and can be subsequently used for deriving attribute predictions for subsequent points.

In various embodiments, the encoder (300), the decoder (400), the encoder (700), and/or the decoder (800) can be implemented with hardware, software, or combination thereof. For example, the encoder (300), the decoder (400), the encoder (700), and/or the decoder (800) can be implemented with processing circuitry such as one or more integrated circuits (ICs) that operate with or without software, such as an application specific integrated circuit (ASIC), field programmable gate array (FPGA), and the like. In another example, the encoder (300), the decoder (400), the encoder (700), and/or the decoder (800) can be implemented as software or firmware including instructions stored in a non-volatile (or non-transitory) computer-readable storage medium. The instructions, when executed by processing circuitry, such as one or more processors, causing the processing circuitry to perform functions of the encoder (300), the decoder (400), the encoder (700), and/or the decoder (800).

It is noted that the attribute prediction modules (750) and (850) configured to implement the attribute prediction techniques disclosed herein can be included in other decoders or encoders that may have similar or different structures from what is shown in FIG. 7 and FIG. 8. In addition, the encoder (700) and decoder (800) can be included in a same device, or separate devices in various examples.

In some embodiments, mesh compression can use coding tools different from PCC coding tools or can use PCC coding tools, such as above PCC (e.g., G-PCC, V-PCC) encoders, above PCC (e.g., G-PCC, V-PCC) decoders, and the like.

A mesh (or 3D mesh) of an object can include polygons that describe the surface of the object. Each polygon can be defined by vertices of the polygon in a 3D space and the information of how the vertices are connected into the polygon. The information of how the vertices are connected is referred to as connectivity information. In some examples, the mesh can also include attributes, such as color, normal, and the like, associated with the vertices. The attributes can be associated with the surface of the mesh by exploiting mapping information that parameterizes the mesh with 2D attribute maps. The mapping information is usually described by a set of parametric coordinates, referred to as UV coordinates or texture coordinates, associated with the mesh vertices. 2D attribute maps (referred to as texture maps in some examples) are used to store high resolution attribute information such as texture, normals, displacements, etc. Such information could be used for various purposes such as texture mapping and shading.

In some embodiments, a mesh can include components that are referred to as geometry information, connectivity information, mapping information, vertex attributes, and attribute maps. In some examples, the geometry information is described by a set of 3D positions associated with the vertices of the mesh. In an example, (x,y,z) coordinates can be used to describe the 3D positions of the vertices. In some examples, the connectivity information includes a set of vertex indices that describes how to connect the vertices to create a 3D surface. In some examples, the mapping information describes how to map the mesh surface to 2D regions of the plane. In an example, the mapping information is described by a set of UV parametric/texture coordinates (u,v) associated with the mesh vertices together with the connectivity information. In some examples, the vertex attributes include scalar or vector attribute values associated with the mesh vertices. In some examples, attribute maps include attributes that are associated with the mesh surface and are stored as 2D images/videos. In an example, the mapping between the videos (e.g., 2D images/videos) and the mesh surface is defined by the mapping information.

In some embodiments, some techniques that are referred to as UV mapping or mesh parameterization are used to map surfaces of a mesh in the 3D domain to 2D domain. In some examples, a mesh is partitioned into patches in the 3D domain. Then, the patches are parameterized respectively into 2D shapes. The 2D shapes can be packed (e.g., oriented and placed) into maps that are also referred to as atlases in some examples. In some examples, the maps can be further processed using 2D image or video processing techniques.

In an example, a UV mapping technique generates a UV atlas (also referred to as UV map) and one or more texture atlas (also referred to as texture map) in 2D corresponding to patches of a 3D mesh. The UV atlas includes assignments of 3D vertices of the 3D mesh to 2D points in a 2D domain (e.g., a rectangular). The UV atlas is a mapping between coordinates of the 3D surface to coordinates of 2D domain. In an example, a point in the UV atlas at a 2D coordinates (u,v) has a value that is formed by coordinates (x,y,z) of a vertex in the 3D domain. In an example, a texture atlas includes color information of the 3D mesh. For example, a point in the texture atlas at the 2D coordinates (u,v) (which has a 3D value of (x,y,z) in the UV atlas) has a color that specifies the color attribute of a point at (x,y,z) in the 3D domain.

A dynamic mesh is a mesh where at least one of the components (geometry information, connectivity information, mapping information, vertex attributes and attribute maps) varies with time. A dynamic mesh can be described by a sequence of meshes (also referred to as mesh frames). The dynamic mesh may require a large amount of data since the dynamic mesh may include a significant amount of information changing over time. Compression technologies of meshes can allow efficient storage and transmission of media contents in the mesh representation.

In some examples, a dynamic mesh can have constant connectivity information, time varying geometry and time varying vertex attributes. In some examples, a dynamic mesh can have time varying connectivity information. In an example, digital content creation tools usually generate dynamic meshes with time varying attribute maps and time varying connectivity information. In some examples, volumetric acquisition techniques are used to generate dynamic meshes. The volumetric acquisition techniques can generate a dynamic mesh with time varying connectivity information especially under real time constraints.

In some embodiments, mesh compression can be performed by representing a mesh using one or more 2D maps (referred to as attribute maps in some examples), and then encoding the 2D maps using image or video codecs. In some examples, re-meshing techniques, such as UV atlas sampling technique, are used in mesh compression. The UV atlas sampling technique re-meshes 3D mesh models via regular grid points sampled on the UV atlas. The original vertices in the UV atlas are replaced by regular grid points. The connectivity information can be inferred from the regular grid points and doesn't need to be separately encoded.

In some examples, using the UV atlas sampling technique, a mesh is represented by a plurality of maps, such as a geometry map (also referred to as UV atlas), color maps (also referred to as color atlases), texture maps (also referred to as texture atlases), an occupancy map and the like. In some examples, the plurality of maps are referred to as attribute maps, and values of samples in the attribute maps are referred to as attribute values. To encode the plurality of maps, image and/or video codecs can be used to achieve compression purpose. According to an aspect of the disclosure, the dynamic range of samples in one or more of the plurality of maps may exceed the capacity of some existing codecs. For example, some video codecs can only support 8-bit coding, while the bitdepth of a geometry map can be 10 bit, 12 bit or even 16 bit.

The disclosure includes methods for encoding and decoding UV coordinates. UV coordinates can be utilized in 2D attribute maps of a 3D mesh, where attribute maps can store texture, normals, displacements, or other high resolution attribute information. The disclosed methods of UV coordinates coding can be employed as a component of 3D mesh compression.

A dynamic mesh sequence can require a large amount of data since the dynamic mesh can include a significant amount of information changing over time. Therefore, efficient compression technologies are required to store and transmit such contents. Mesh compression standards, such as interpolator compression (IC), MESHGRID, and Frame-based Animated Mesh Compression (FAMC), were previously developed by MPEG to address dynamic meshes with a constant connectivity, a time varying geometry, and vertex attributes. However, the mesh compression standards do not consider time varying attribute maps and connectivity information. DCC (Digital Content Creation) tools usually generate such dynamic meshes. In counterpart, it is challenging for volumetric acquisition techniques to generate a constant connectivity dynamic mesh, especially under real time constraints. This type of contents is not supported by the existing standards. MPEG is planning to develop a new mesh compression standard to directly handle dynamic meshes with time varying connectivity information and optionally time varying attribute maps. The new mesh compression standard targets lossy and lossless compression for various applications, such as real-time communications, storage, free viewpoint video, AR, and VR. Functionalities, such as random access and scalable/progressive coding, are also considered.

Transmitting a high quality 3D mesh can be challenging due to large memory footprints of the high quality 3D mesh. Designing efficient compression algorithms for a 3D mesh is therefore of prime importance to enable the deployment of consumer-level applications, such as VR/AR, and to facilitate streaming of 3D videos.

Figure 9:
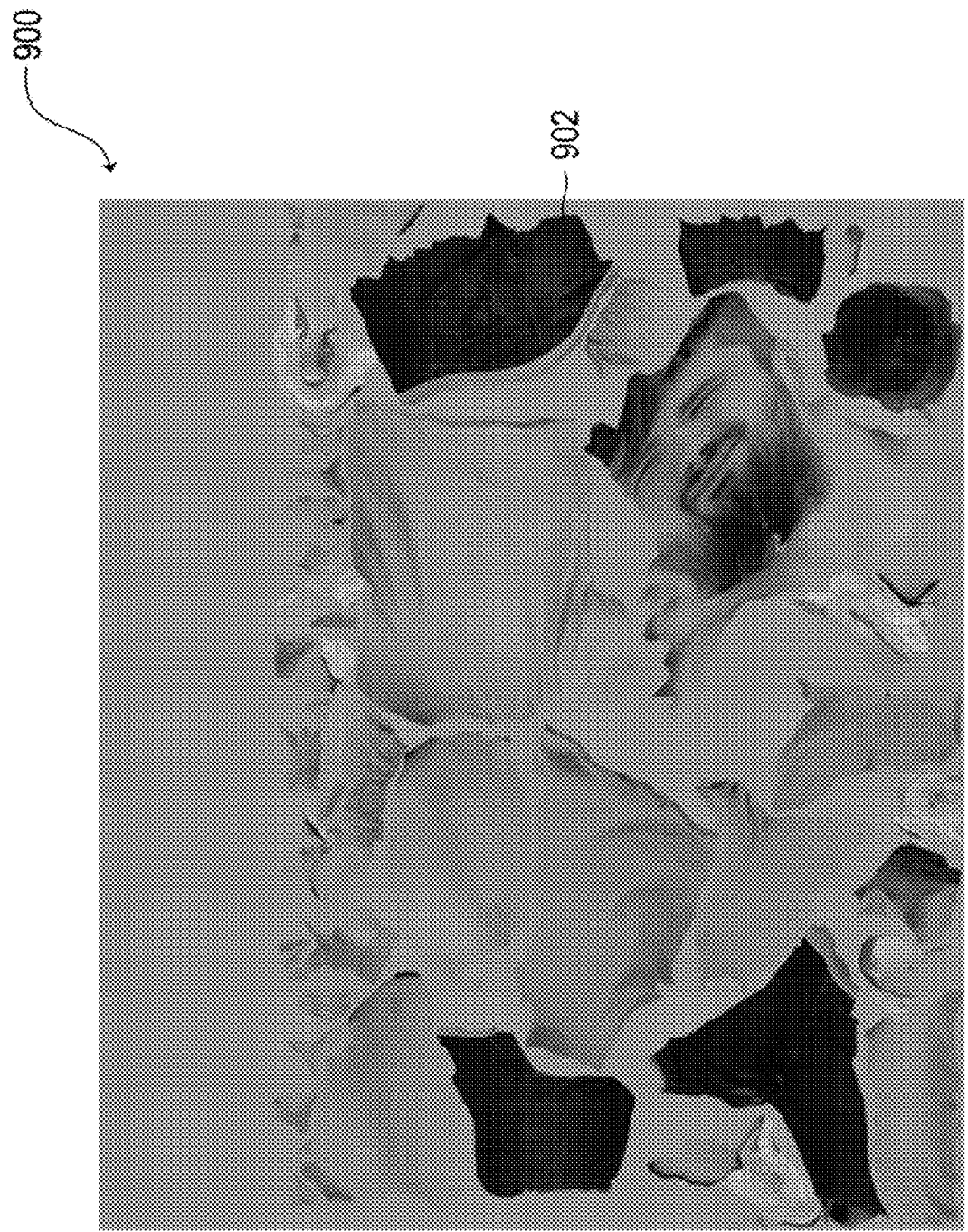
FIG. 9 shows an exemplary texture image of a three-dimensional (3D) mesh in some examples.

3D mesh compression includes geometry compression and texture compression. The geometry compression targets a geometric surface representation, and texture compression is for texture images associated with the 3D mesh through UV maps. FIG. 9 is an example of a texture image (900) of a 3D mesh at one time instant. In the texture image (900), patches (e.g., (902)) that represent a color attribute of the 3D mesh can be placed together. A patch vertex can be associated with a mesh vertex. Accordingly, pixel coordinates of the patch vertex, which are referred to as UV coordinates, are associated with 3D coordinates of the mesh vertex.

UV coordinates of 3D mesh vertices can be represented as a list of two-dimensional coordinates: one is the U coordinates and another is the V coordinates.

In the disclosure, the UV coordinates of the 3D mesh can be received at first. For example, the UV coordinates of the 3D mesh can be generated by processing circuitry and transmitted to an encoder (e.g., (600) or (700)). The UV coordinates can be two-dimensional (2D) texture coordinates that include U coordinates in a first axis and V coordinates in a second axis and correspond with vertices of the 3D mesh.

A data preparation process can further be performed on the UV coordinates of the 3D mesh. The data preparation process can include a quantization process, a separation process, or a transformation process. The quantization process can be configured to convert the UV coordinates, such as into a plurality of indicators. The separation process can be configured to separate the UV coordinates into the U coordinates and the V coordinates respectively. The transformation process can be configured to convert the UV coordinates, such as from a spatial domain into a frequency domain.

It should be noted that the quantization process, the separation process, and the transformation process can be performed individually or in any combination. For example, the quantization process can be performed at first and the transformation process can be performed after the quantization. In another example, the separation process can be performed on the UV coordinates, and the quantization process or the transformation process can be performed after the separation process.

After the data preparation process, compression can be performed on the UV coordinates. The compression can be a lossy compression or a lossless compression. The compression can include an image/video compression, an integer compression, or the like.

In the disclosure, the original U and V coordinates can be quantized. The original U and V coordinates can be quantized first based on a quantization process before encoding, and dequantized after decoding.

In an embodiment, a linear scalar quantization can be applied to the U and V coordinates. For example, the U and V coordinates can be divided by a specific scalar factor. In another example, different quantization scalars (e.g., different scalar factors) can be applied to the U coordinates and the V coordinates, respectively. The quantization scalar (e.g., scalar factor) or different quantization scalars (e.g., different scalar factors) can be signaled in the bitstream in some embodiments. On the decoder side, a dequantization can be applied on each of the two coordinates (e.g., U coordinates and V coordinates) by multiplying the quantization scalar or the respective quantization scalars with each of the two coordinates.

In an embodiment, a vector quantization can be applied to pairs of U and V coordinates, where each pair of U and V coordinates can include a respective U coordinate and a respective V coordinate. According to the vector quantization, each pair of U and V coordinates can be represented by an indicator to a vector dictionary that is associated with the vector quantization. The vector dictionary can further be signalled as an additional overhead in a bitstream or pre-trained and fixed for an encoder (e.g., (600) or (700)) and a decoder (e.g., (500) or (800)).

After the quantization, the UV coordinates can be coded. For example, the UV coordinates can be losslessly coded. Lossless coding of UV coordinates can be based on an image/video compression or based on an integer compression. The integer compression can be any integer compression, such as a lossless integer compression.

In the disclosure, the UV coordinates can be separated into U coordinates and V coordinates individually based on a separation process. A codec can further be applied to compress the U coordinates or the V coordinates.

In an embodiment, UV coordinates of a mesh frame can be separated into U coordinates and V coordinates. Each of the U coordinates and the V coordinates can further be reshaped into a 2D array respectively. Any space-filling curve can be applied to fill the 2D array, such as a snake scanning order, a raster scanning order, a zig-zag scanning order, and a Hilbert and Morton scanning order. The scanning order can be fixed for both an encoder (e.g., (600) or (700)) or a decoder ((500) or (800)), or can be specified in high-level syntax, such as a sequence header, a slice header, etc. The 2D array can be regarded as a picture. For dynamic meshes, multiple 2D arrays can be generated to form a video. An image/video codec can be applied to each image/video (or 2D array) that is derived from the U coordinates and the V coordinates. In some embodiments, lossless coding can be applied to each of the 2D arrays. Thus, the image/video codec can be a lossless image/video codec.

Various scanning orders can be utilized to reshape the U coordinates and the V coordinates into a 2D array. In an embodiment, a raster scanning order can be applied to reshape the U coordinates or the V coordinates into a 2D array.

Figure 10:
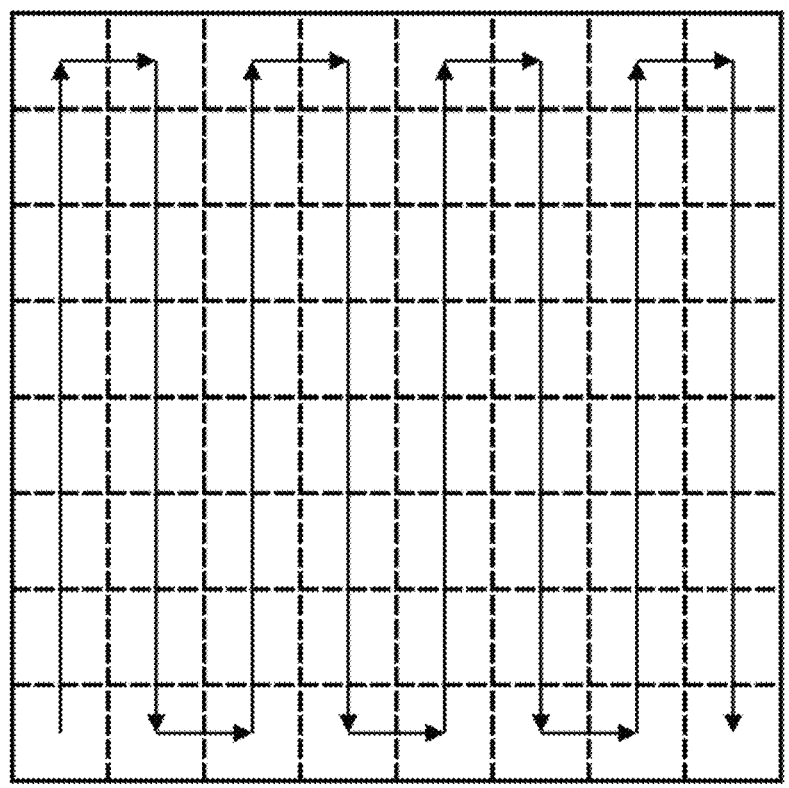
FIG. 10 shows a diagram of a snake scanning order in some examples.

In an embodiment, a snake scanning order can be applied to reshape the U coordinates or the V coordinates into a 2D array. An exemplary snake scanning order is shown in FIG. 10. For example, a scanning direction of the snake scanning order can be either along a horizontal direction (as shown in FIG. 10) or a vertical direction.

Figure 11:
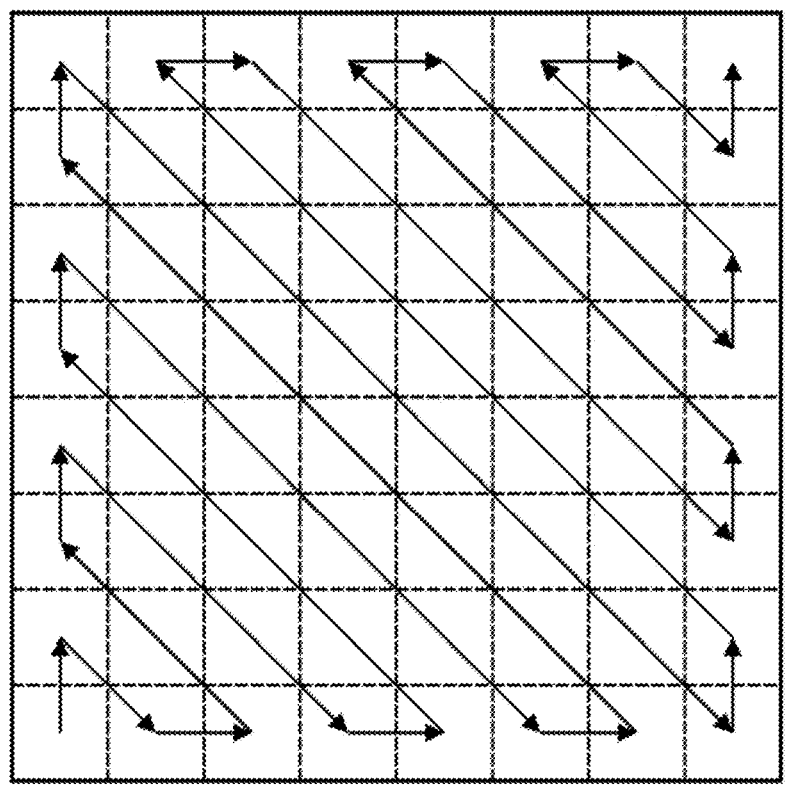
FIG. 11 shows a diagram of a zig-zag scanning order in some examples.

In an embodiment, a zig-zag scanning order can be applied to reshape the U coordinates or the V coordinates into a 2D array. An exemplary zig-zag scanning order is shown in FIG. 11.

After the separation process, a video codec can be used to code each of the U coordinates and the V coordinates. In an example, a lossless coding can be applied. For example, the lossless coding can be applied based on one of (1) AVC/H.264 video codec, (2) HEVC/H.265 video codec, (3) VVC/H.266 video, (4) AVS2 video codec, (5) AVS3 video codec, (6) AV1 video codec, (7) JPEG image codec, or (8) JPEG2000 image codec.

In the disclosure, a transformation process (or a transform) can be applied to pairs of U coordinates and V coordinates. A transform output of the transformation process can be separated into two channels: one channel is based on the U coordinates and the other channel is based on the V coordinates. Further, each of the two channels can be reshaped into a respective 2D array. An image/video codec can be applied to each of the two channels, in a similar way as described above.

In an example, an invertible transform (e.g., a Harr transform or a linear decorrelation transform) can be used.

In an embodiment, a 2-tap Haar transform can be applied to the pairs of U coordinates and V coordinates.

In an embodiment, a linear decorrelation transform (e.g., a discrete cosine transform) can be applied to the pairs of U coordinates and V coordinates.

In another embodiment, the UV coordinates can be separated into U coordinates and V coordinates. Each of the U coordinates and the V coordinates can be losslessly coded based on an integer compression.

In the disclosure, values of U coordinates and/or V coordinates can be predicted from prior coded information, such as prior coded U coordinates and/or V coordinates. Accordingly, a list of prediction residues can be generated. In some embodiments, the list of prediction residues can be a list of integers. The prediction residues can be differences between the values of U coordinates and/or V coordinates and the prior coded U coordinates and/or V coordinates. In an embodiment, the prediction residues can further be losslessly coded based on an integer compression.

In an embodiment, the prediction residues can be mapped to non-negative integers. The mapping can concatenate a sign bit to a value of a prediction residue. For example, a mapping function f(n) can be defined as follows:

If $n>=0, f(n)=2*n$

If $n<0, f(n)=-2*n-1$ where n can be a prediction residue. Based on the mapping, the prediction residue can be changed to a non-negative integer.

In an embodiment, a sign bit of the prediction residue can be coded separately in a lossless manner, while an absolute value of the prediction residue can be coded by any entropy coder.

In an embodiment, bit packing can be applied to non-negative integers that are obtained based on the mapping to further reduce a bit length of the non-negative integers. For example, in a list of non-negative integers $\{m_1, m_2, \ldots, m_k\}$, if each of the non-negative integers can be represented as n-bit integers, where n is a positive integer, the list of the non-negative integers can be presented by the bit packing by using k*n bits. Accordingly, the list of non-negative integers can be presented by a list of bits. The k can be a number of the non-negative integers in the list of non-negative integers. The value of n can be communicated between an encoder and a decoder using a fixed length representation, such as one byte. In another example, the n can be 2 bits or 6 bits.

In an embodiment, a lossless compression, such as an entropy coding, can be applied to the list of integers, the list of predicted residues, the list of non-negative integers, or the list of bits.

In an embodiment, a variable length coding can be applied to the list of integers, the list of predicted residues, the list of non-negative integers, or the list of bits.

In an embodiment, a Huffman coding can be applied to the list of integers, the list of predicted residues, the list of non-negative integers, or the list of bits.

In an embodiment, an arithmetic coding can be applied to the list of integers, the list of predicted residues, the list of non-negative integers, or the list of bits.

In the disclosure, the UV coordinates can be quantized at first. The quantized UV coordinates can be further losslessly coded. The lossless coding of the quantized UV coordinates can be based on an image/video compression or an integer compression.

In the disclosure, the UV coordinates can be lossy coded. The lossy coding of the UV coordinates can be based on an image/video compression or an integer compression.

In an embodiment, the UV coordinates can be separated into U coordinates and V coordinates. Accordingly, the two-dimensional UV coordinates can be split into the U coordinates in a first dimension and the V coordinates in a second dimension. Each of the U coordinates and the V coordinates can be reshaped to a respective 2D array. A lossy image/video codec can further be applied to each of the U coordinates and V coordinates. The lossy image/video codec can include (1) AVC/H.264 video codec, (2) HEVC/H.265 video codec, (3) VVC/H.266 video, (4) AVS2 video codec, (5) AVS3 video codec, (6) AV1 video codec, (7) JPEG image codec, and (8) JPEG2000 image codec.

In an embodiment, a transform can be applied to the U coordinates and the V coordinates. A transform output can be separated into two channels: one channel is based on the U coordinates and the other channel is based on the V coordinates. Each of the two channels can be reshaped to a respective 2D array. A lossy image/video codec can then be applied to each of the two channels.

In an embodiment, the UV coordinates can be separated into U coordinates and V coordinates. Each of the U coordinates and the V coordinates can be lossy coded based on an integer compression.

In an embodiment, the UV coordinates can be quantized. The quantized UV coordinates can be lossy coded. Lossy coding of quantized UV coordinates can be based on an image/video compression or based on an integer compression.

In an embodiment, the UV coordinates can be lossy coded. Lossy compression residues of the lossy coding, which can be differences of the initial values of the UV coordinates and the predictions, can further be lossless coded.

In an embodiment, compression of UV coordinates can include two layers, where a lossy compression on the UV coordinates can be a base layer, and a lossless compression of a residue of the base layer can be an additional layer. In an embodiment, the base layer can be a lossy image/video codec. In an embodiment, the base layer can be a lossy compression of integers (or a lossy integer compression). In an embodiment, the additional layer can be a lossless image/video codec. In an embodiment, the additional layer can be a lossless compression of integers (or a lossless integer compression).

In another embodiment, the UV coordinates can be quantized. The quantized UV coordinates can be lossy coded. Lossy compression residues of the lossy coding of the quantized UV coordinates can further be lossless coded.

Figure 12:
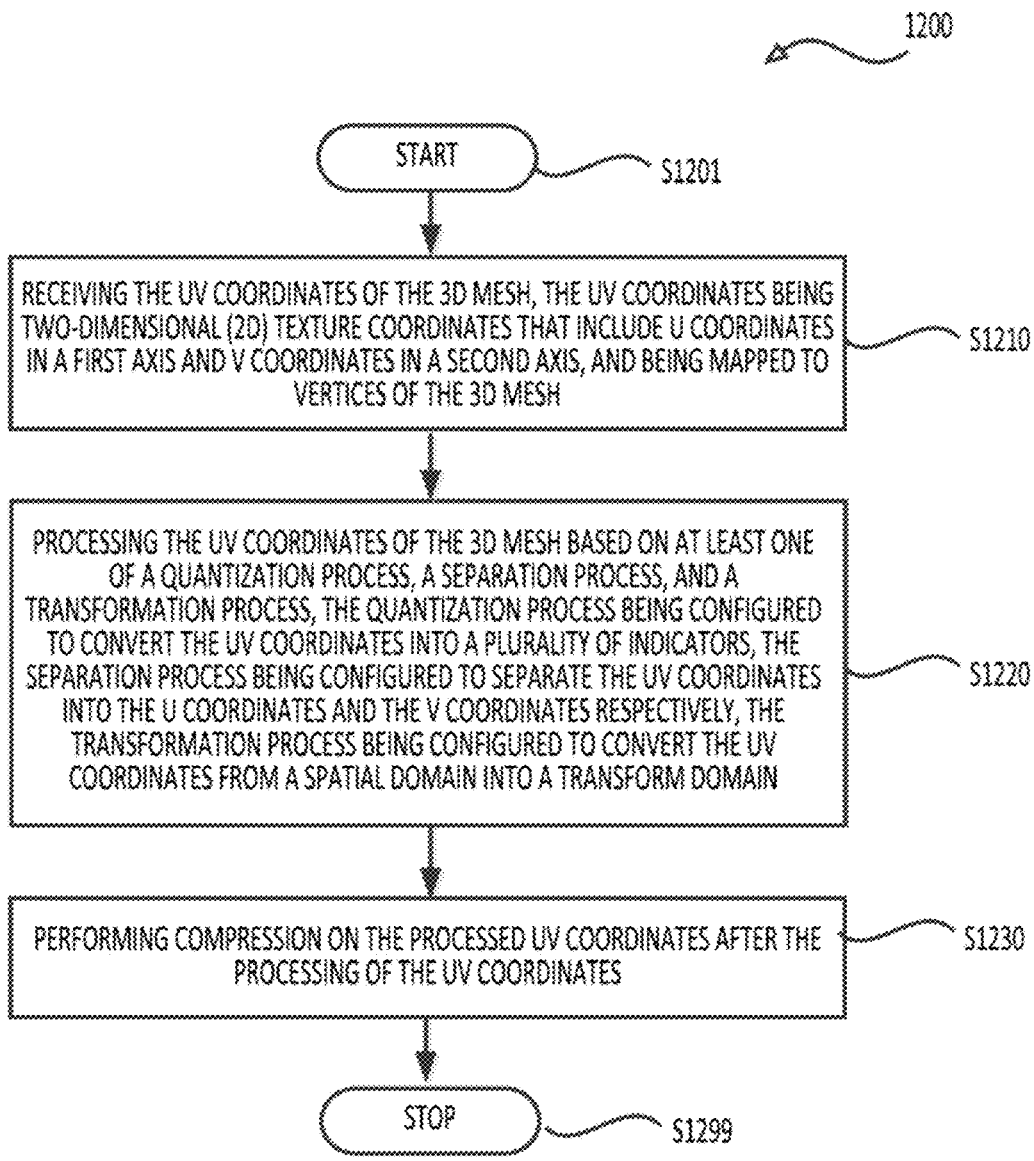
FIG. 12 shows a flow chart outlining a compression process in some examples.

FIG. 12 shows a flow chart outlining a process (1200) according to an embodiment of the disclosure. The process (1200) can be used during an encoding process for a mesh. In various embodiments, the process (1200) is executed by processing circuitry. In some embodiments, the process (1200) is implemented in software instructions, thus when the processing circuitry executes the software instructions, the processing circuitry performs the process (1200). The process starts at (S1201) and proceeds to (S1210).

At (S1210), the UV coordinates of the 3D mesh can be received. The UV coordinates can be 2D texture coordinates that include U coordinates in a first axis and V coordinates in a second axis, and be mapped to vertices of the 3D mesh.

At (S1220), the UV coordinates of the 3D mesh can be processed based on at least one of a quantization process, a separation process, and a transformation process. The quantization process can be configured to convert the UV coordinates into a plurality of indicators. The separation process can be configured to separate the UV coordinates into the U coordinates and the V coordinates respectively. The transformation process can be configured to convert the UV coordinates from a spatial domain into a transform (or frequency) domain.

At (S1230), compression can be performed on the processed UV coordinates after the processing of the UV coordinates.

In some embodiments, the processing can be based on the quantization process. In an example, a linear scalar quantization can be applied to the U coordinates and the V coordinates of the UV coordinates respectively by dividing the U coordinates with a first scalar factor and the V coordinates with a second scalar factor. In another example, a vector quantization can be applied to a plurality of UV pairs of the UV coordinates. Each UV pair of the plurality of UV pairs can include a respective U coordinate and a respective V coordinate and be represented by an indicator to a vector dictionary of the vector quantization.

In some embodiments, the processing is based on the separation process. Accordingly, the UV coordinates can be separated into the U coordinates and the V coordinates. A first 2D array can be generated based on the U coordinates of the UV coordinates. A second 2D array can be generated based on the V coordinates of the UV coordinates. The compression can subsequently be performed on the U coordinates of the UV coordinates in the first 2D array, and on the V coordinates of the UV coordinates in the second 2D array respectively.

In some embodiments, the processing is based on the transformation process. Accordingly, the transformation process can be performed on a plurality of UV pairs of the UV coordinates based on one of an invertible transform, a Haar transform, or a linear decorrelation transform. Each UV pair of the plurality of UV pairs can include a respective U coordinate and a respective V coordinate of the UV coordinates. First channel information can be generated based on the transformed U coordinates of the plurality of UV pairs of the UV coordinates and second channel information can be generated based on the transformed V coordinates of the plurality of UV pairs of the UV coordinates. The compression can further be performed on the first channel information of the UV coordinates and on the second channel information of the UV coordinates respectively.

In the process (1200), the compression can be performed on the UV coordinates based on one of an image/video compression or an integer compression on the UV coordinates.

In some embodiments, values of the U coordinates of the UV coordinates can be predicted based on values of prior coded U coordinates. A list of prediction residues of the U coordinates can further be generated. Values of the V coordinates of the UV coordinates can be generated based on values of prior coded V coordinates. A list of prediction residues of the V coordinates can be further generated.

In some embodiments, a first mapping operation can be performed on the list of the prediction residues of the U coordinates to generate a list of non-negative integers of the U coordinates. A second mapping operation can be generated on the list of the prediction residues of the V coordinates to generate a list of non-negative integers of the V coordinates.

In some embodiments, a first bit packing process can be performed on the list of the non-negative integers of the U coordinates to generate a list of bits of the U coordinates. A second bit packing process can be performed on the list of the non-negative integers of the V coordinates to generate a list of bits of the V coordinates.

In some embodiments, the compression can be performed on at least one of the list of the prediction residues of the U coordinates, the list of the prediction residues of the V coordinates, the list of the non-negative integers of the U coordinates, the list of the non-negative integers of the V coordinates, the list of bits of the U coordinates, or the list of bits of the V coordinates. In some embodiments, the compression can be performed based on one of an entropy coding, a variable length coding, a Huffman coding, or an arithmetic coding.

In the process (1200), a lossy compression can be performed on the UV coordinates to generate lossy compression residues of the UV coordinates based on one of a lossy image/video codec and a lossy integer compression. A lossless compression can be performed on the lossy compression residues of the UV coordinates based on one of a lossless image/video codec and a lossless integer compression.

Then, the process proceeds to (S1299) and terminates.

The process (1200) can be suitably adapted. Step(s) in the process (1200) can be modified and/or omitted. Additional step(s) can be added. Any suitable order of implementation can be used.

Figure 13:
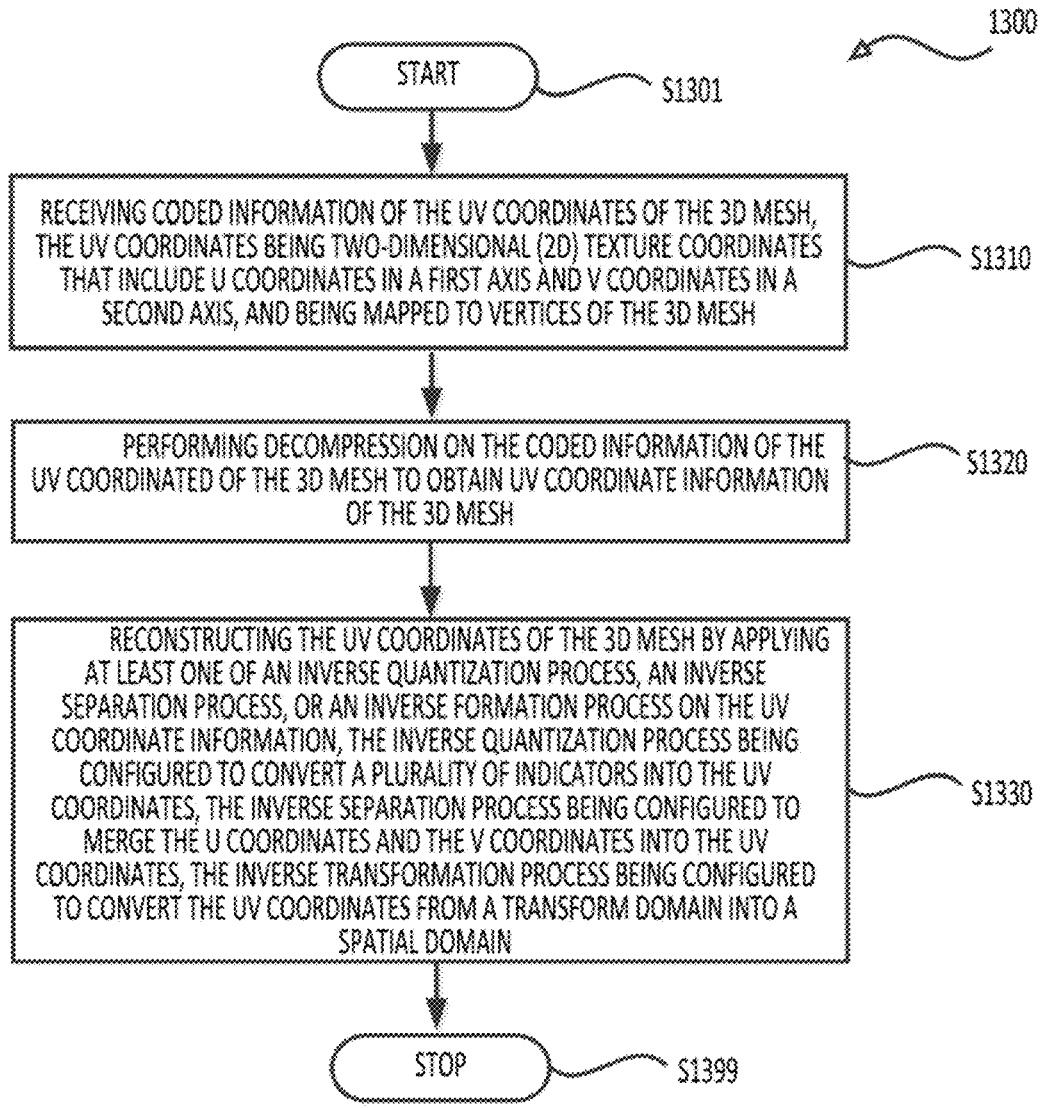
FIG. 13 shows a flow chart outlining a decompression process in some examples.

FIG. 13 shows a flow chart outlining a process (1300) according to an embodiment of the disclosure. The process (1300) can be used during a decoding process for a mesh. In various embodiments, the process (1300) is executed by processing circuitry. In some embodiments, the process (1300) is implemented in software instructions, thus when the processing circuitry executes the software instructions, the processing circuitry performs the process (1300). The process starts at (S1301) and proceeds to (S1310).

At (S1310), coded information of the UV coordinates of the 3D mesh can be received. The UV coordinates can be two-dimensional (2D) texture coordinates that include U coordinates in a first axis and V coordinates in a second axis, and be mapped to vertices of the 3D mesh.

At (S1320), decompression can be performed on the coded information of the UV coordinated of the 3D mesh to obtain UV coordinate information of the 3D mesh.

At (S1340), the UV coordinates of the 3D mesh can be reconstructed by applying at least one of an inverse quantization process, an inverse separation process, or an inverse formation process on the UV coordinate information. The inverse quantization process can be configured to convert a plurality of indicators into the UV coordinates. The inverse separation process can be configured to merge the U coordinates and the V coordinates into the UV coordinates. The inverse transformation process can be configured to convert the UV coordinates from a transform domain into a spatial domain.

Then, the process proceeds to (S1399) and terminates.

The process (1300) can be suitably adapted. Step(s) in the process (1300) can be modified and/or omitted. Additional step(s) can be added. Any suitable order of implementation can be used.

The techniques described above, can be implemented as computer software using computer-readable instructions and physically stored in one or more computer-readable media. For example, FIG. 14 shows a computer system (1400) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 14:
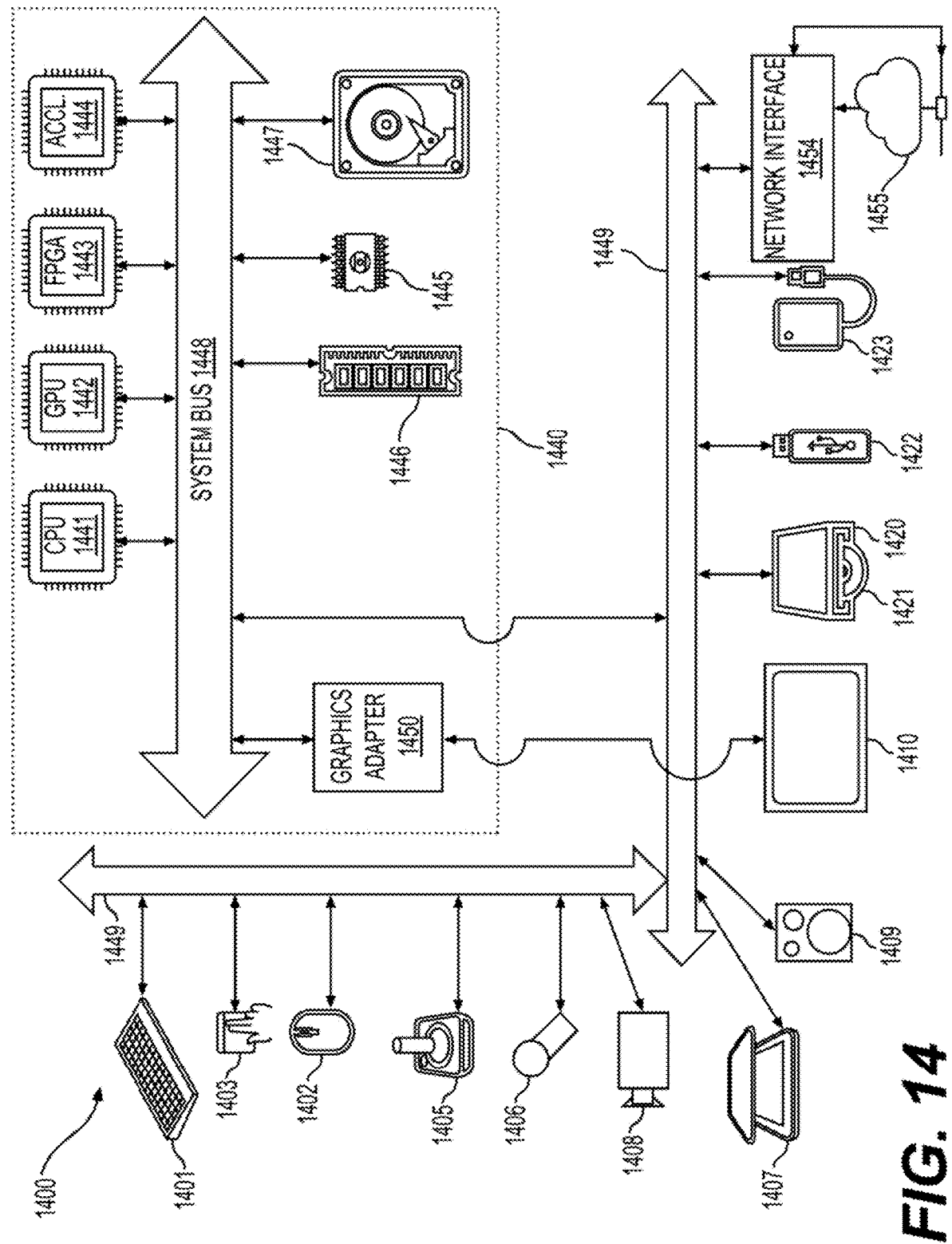
FIG. 14 is a schematic illustration of a computer system in some examples.

The components shown in FIG. 14 for computer system (1400) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1400).

Computer system (1400) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1401), mouse (1402), trackpad (1403), touch screen (1410), data-glove (not shown), joystick (1405), microphone (1406), scanner (1407), camera (1408).

Computer system (1400) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1410), data-glove (not shown), or joystick (1405), but there can also be tactile feedback devices that do not serve as input devices), audio output devices (such as: speakers (1409), headphones (not depicted)), visual output devices (such as screens (1410) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1400) can also include human accessible storage devices and their associated media such as optical media including CD/DVD ROM/RW (1420) with CD/DVD or the like media (1421), thumb-drive (1422), removable hard drive or solid state drive (1423), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1400) can also include an interface (1454) to one or more communication networks (1455). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1449) (such as, for example USB ports of the computer system (1400)); others are commonly integrated into the core of the computer system (1400) by attachment to a system bus as described below (for example Ethernet interface into a PC computer system or cellular network interface into a smartphone computer system). Using any of these networks, computer system (1400) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1440) of the computer system (1400).

The core (1440) can include one or more Central Processing Units (CPU) (1441), Graphics Processing Units (GPU) (1442), specialized programmable processing units in the form of Field Programmable Gate Areas (FPGA) (1443), hardware accelerators for certain tasks (1444), graphics adapters (1450), and so forth. These devices, along with Read-only memory (ROM) (1445), Random-access memory (1446), internal mass storage such as internal non-user accessible hard drives, SSDs, and the like (1447), may be connected through a system bus (1448). In some computer systems, the system bus (1448) can be accessible in the form of one or more physical plugs to enable extensions by additional CPUs, GPU, and the like. The peripheral devices can be attached either directly to the core's system bus (1448), or through a peripheral bus (1449). In an example, the screen (1410) can be connected to the graphics adapter (1450). Architectures for a peripheral bus include PCI, USB, and the like.

CPUs (1441), GPUs (1442), FPGAs (1443), and accelerators (1444) can execute certain instructions that, in combination, can make up the aforementioned computer code. That computer code can be stored in ROM (1445) or RAM (1446). Transitional data can be also be stored in RAM (1446), whereas permanent data can be stored for example, in the internal mass storage (1447). Fast storage and retrieve to any of the memory devices can be enabled through the use of cache memory, that can be closely associated with one or more CPU (1441), GPU (1442), mass storage (1447), ROM (1445), RAM (1446), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1400), and specifically the core (1440) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1440) that are of non-transitory nature, such as core-internal mass storage (1447) or ROM (1445). The software implementing various embodiments of the present disclosure can be stored in such devices and executed by core (1440). A computer-readable medium can include one or more memory devices or chips, according to particular needs. The software can cause the core (1440) and specifically the processors therein (including CPU, GPU, FPGA, and the like) to execute particular processes or particular parts of particular processes described herein, including defining data structures stored in RAM (1446) and modifying such data structures according to the processes defined by the software. In addition or as an alternative, the computer system can provide functionality as a result of logic hardwired or otherwise embodied in a circuit (for example: accelerator (1444)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of processing UV coordinates of a three-dimensional (3D) mesh, the method comprising:
   receiving the UV coordinates of the 3D mesh, the UV coordinates being two-dimensional (2D) texture coordinates that include U coordinates in a first axis and V coordinates in a second axis, and being mapped to vertices of the 3D mesh;
   separating (i) the U coordinates from the UV coordinates into a first 2D array and (ii) the V coordinates from the UV coordinates into a second 2D array that is different from the first 2D array according to a predefined scanning order;
   processing the U coordinates and the V coordinates of the 3D mesh separately based on at least one of a quantization process, and a transformation process, the quantization process being configured to convert the UV U coordinates and the V coordinates into a plurality of indicators, the transformation process being configured to convert the U coordinates and the V coordinates from a spatial domain into a transform domain; and
   performing compression on the processed UV U coordinates and the processed V coordinates of the 3D mesh.

2. The method of claim 1, wherein the processing is based on the quantization process, and the processing further comprises one of:
   applying a linear scalar quantization to the U coordinates and the V coordinates of the UV coordinates respectively by dividing the U coordinates with a first scalar factor and the V coordinates with a second scalar factor; and
   applying a vector quantization to a plurality of UV pairs of the UV coordinates, each UV pair of the plurality of UV pairs including a respective U coordinate and a respective V coordinate and being represented by an indicator to a vector dictionary of the vector quantization.

3. The method of claim 1, wherein
   the performing the compression further comprises:
      performing the compression on the U coordinates of the UV coordinates in the first 2D array; and
      performing the compression on the V coordinates of the UV coordinates in the second 2D array.

4. The method of claim 1, wherein:
   the processing is based on the transformation process, and the processing further comprises:
      performing the transformation process on a plurality of UV pairs of the UV coordinates based on one of an invertible transform, a Haar transform, or a linear decorrelation transform, each UV pair of the plurality of UV pairs including a respective U coordinate and a respective V coordinate of the UV coordinates; and
      generating first channel information based on the transformed U coordinates of the plurality of UV pairs of the UV coordinates and second channel information based on the transformed V coordinates of the plurality of UV pairs of the UV coordinates; and
   the performing the compression further comprises:
      performing the compression on the first channel information of the UV coordinates; and
      performing the compression on the second channel information of the UV coordinates.

5. The method of claim 1, wherein the performing the compression on the UV coordinates further comprises:
   performing one of an image/video compression or an integer compression on the UV coordinates.

6. The method of claim 1, further comprising:
   predicting values of the U coordinates of the UV coordinates based on values of prior coded U coordinates and generating a list of prediction residues of the U coordinates; and
   predicting values of the V coordinates of the UV coordinates based on values of prior coded V coordinates and generating a list of prediction residues of the V coordinates.

7. The method of claim 6, further comprising:
   performing a first mapping operation on the list of the prediction residues of the U coordinates to generate a list of non-negative integers of the U coordinates; and
   performing a second mapping operation on the list of the prediction residues of the V coordinates to generate a list of non-negative integers of the V coordinates.

8. The method of claim 7, further comprising:
   performing a first bit packing process on the list of the non-negative integers of the U coordinates to generate a list of bits of the U coordinates; and
   performing a second bit packing process on the list of the non-negative integers of the V coordinates to generate a list of bits of the V coordinates.

9. The method of claim 8, wherein:
   the performing the compression includes performing the compression on at least one of the list of the prediction residues of the U coordinates, the list of the prediction residues of the V coordinates, the list of the non-negative integers of the U coordinates, the list of the non-negative integers of the V coordinates, the list of bits of the U coordinates, or the list of bits of the V coordinates, and
   the compression is performed based on one of an entropy coding, a variable length coding, a Huffman coding, or an arithmetic coding.

10. The method of claim 1, wherein the performing the compression further comprises:
    performing a lossy compression on the UV coordinates to generate lossy compression residues of the UV coordinates based on one of a lossy image/video codec and a lossy integer compression; and performing a lossless compression on the lossy compression residues of the UV coordinates based on one of a lossless image/video codec and a lossless integer compression.

11. An apparatus for processing UV coordinates of a three-dimensional (3D) mesh, comprising:
processing circuitry configured to:
receive the UV coordinates of the 3D mesh, the UV coordinates being two-dimensional (2D) texture coordinates that include U coordinates in a first axis and V coordinates in a second axis, and being mapped to vertices of the 3D mesh;
separate (i) the U coordinates from the UV coordinates into a first 2D array and (ii) the V coordinates from the UV coordinates into a second 2D array that is different from the first 2D array according to a predefined scanning order;
process the UV coordinates of the 3D mesh based on at least one of a quantization process, and a transformation process, the quantization process being configured to convert the U coordinates and the V coordinates into a plurality of indicators, the transformation process being configured to convert the U coordinates and the V coordinates from a spatial domain into a transform domain; and
perform compression on the processed U coordinates and the processed V coordinates of the 3D mesh.

12. The apparatus of claim 11, wherein the processing circuitry is configured to process the UV coordinates based on the quantization process by performing one of:
a linear scalar quantization that is applied to the U coordinates and the V coordinates of the UV coordinates respectively by dividing the U coordinates with a first scalar factor and the V coordinates with a second scalar factor; and
a vector quantization that is applied to a plurality of UV pairs of the UV coordinates, each UV pair of the plurality of UV pairs including a respective U coordinate and a respective V coordinate and being represented by an indicator to a vector dictionary of the vector quantization.

13. The apparatus of claim 11, wherein the processing circuitry is configured to:
perform the compression on the U coordinates of the UV coordinates in the first 2D array; and
perform the compression on the V coordinates of the UV coordinates in the second 2D array.

14. The apparatus of claim 11, wherein the processing circuitry is configured to:
perform the transformation process on a plurality of UV pairs of the UV coordinates based on one of an invertible transform, a Haar transform, or a linear decorrelation transform, each UV pair of the plurality of UV pairs including a respective U coordinate and a respective V coordinate of the UV coordinates;
generate first channel information based on the transformed U coordinates of the plurality of UV pairs of the UV coordinates and second channel information based on the transformed V coordinates of the plurality of UV pairs of the UV coordinates;
perform the compression on the first channel information of the UV coordinates; and
perform the compression on the second channel information of the UV coordinates.

15. The apparatus of claim 11, wherein the processing circuitry is configured to:
perform one of an image/video compression or an integer compression on the UV coordinates.

16. The apparatus of claim 11, wherein the processing circuitry is configured to:
predict values of the U coordinates of the UV coordinates based on values of prior coded U coordinates and generate a list of prediction residues of the U coordinates; and
predict values of the V coordinates of the UV coordinates based on values of prior coded V coordinates and generate a list of prediction residues of the V coordinates.

17. The apparatus of claim 16, wherein the processing circuitry is configured to:
perform a first mapping operation on the list of the prediction residues of the U coordinates to generate a list of non-negative integers of the U coordinates; and
perform a second mapping operation on the list of the prediction residues of the V coordinates to generate a list of non-negative integers of the V coordinates.

18. The apparatus of claim 17, wherein the processing circuitry is configured to:
perform a first bit packing process on the list of the non-negative integers of the U coordinates to generate a list of bits of the U coordinates; and
perform a second bit packing process on the list of the non-negative integers of the V coordinates to generate a list of bits of the V coordinates.

19. The apparatus of claim 18, wherein:
the processing circuitry is configured to perform the compression on at least one of the list of the prediction residues of the U coordinates, the list of the prediction residues of the V coordinates, the list of the non-negative integers of the U coordinates, the list of the non-negative integers of the V coordinates, the list of bits of the U coordinates, or the list of bits of the V coordinates, and
the compression is performed based on one of an entropy coding, a variable length coding, a Huffman coding, or an arithmetic coding.

20. The apparatus of claim 11, wherein the processing circuitry is configured to:
perform a lossy compression on the UV coordinates to generate lossy compression residues of the UV coordinates based on one of a lossy image/video codec and a lossy integer compression; and
perform a lossless compression on the lossy compression residues of the UV coordinates based on one of a lossless image/video codec and a lossless integer compression.

* * * * *